United States Patent [19]

Kanda et al.

[11] Patent Number: 5,664,873

[45] Date of Patent: Sep. 9, 1997

[54] SURFACE LIGHTING DEVICE AND A DISPLAY HAVING SUCH A LIGHTING DEVICE

[75] Inventors: Toshiyuki Kanda, Chigasaki; Hisao Tajima, Yokohama; Hiroshi Takabayashi, Kawasaki; Takashi Yamamoto, Yamato; Hideo Mori, Fujisawa, all of Japan

[73] Assignee: Canon Kabushiki Kaisha, Tokyo, Japan

[21] Appl. No.: 373,096

[22] Filed: Jan. 17, 1995

Related U.S. Application Data

[62] Division of Ser. No. 984,836, Dec. 3, 1992, Pat. No. 5,438,484.

[30] Foreign Application Priority Data

Dec. 6, 1991 [JP] Japan ................... 3-348565
May 20, 1992 [JP] Japan ................... 4-151225

[51] Int. Cl.⁶ ............................................. G02F 1/1335
[52] U.S. Cl. ....................... 362/97; 385/901; 349/62
[58] Field of Search ........................ 362/31, 26, 27, 362/33, 97; 248/316.7, 74.2; 385/15, 31, 95, 96, 98, 901; 359/49, 599

[56] References Cited

U.S. PATENT DOCUMENTS

| 1,371,272 | 3/1921 | Strong | 248/316.7 |
|---|---|---|---|
| 2,017,597 | 10/1935 | Howenstine | 40/13 |
| 2,740,735 | 4/1956 | Swain | 248/316.7 |
| 3,154,281 | 10/1964 | Frank | 248/316.7 |
| 4,071,883 | 1/1978 | Dennis | 362/97 |
| 4,335,421 | 6/1982 | Modla et al. | 362/97 |
| 4,487,475 | 12/1984 | Ogawa | 385/95 |
| 4,826,294 | 5/1989 | Imoto | 359/49 |
| 4,843,458 | 6/1989 | Ito | 358/80 |
| 4,860,171 | 8/1989 | Kojima | 362/31 |
| 4,957,343 | 9/1990 | Sato et al. | 385/96 |
| 4,974,122 | 11/1990 | Shaw | 362/31 |
| 5,050,946 | 9/1991 | Hathaway et al. | 381/901 |
| 5,064,276 | 11/1991 | Endo et al. | 362/31 |
| 5,139,340 | 8/1992 | Okumura | 359/63 |
| 5,143,433 | 9/1992 | Farrell | 359/49 |
| 5,150,231 | 9/1992 | Iwamoto | 359/44 |
| 5,165,072 | 11/1992 | Kurita et al. | 358/448 |
| 5,202,950 | 4/1993 | Arego et al. | 385/901 |
| 5,222,171 | 6/1993 | Straus | 385/96 |
| 5,384,658 | 1/1995 | Ohtake et al. | 359/599 |

FOREIGN PATENT DOCUMENTS

| 0167721 | 1/1986 | European Pat. Off. . |
|---|---|---|
| 0355064 | 2/1990 | European Pat. Off. . |
| 0501761 | 9/1992 | European Pat. Off. . |
| 3835754 | 5/1989 | Germany . |
| 3-89301 | 3/1991 | Japan . |

OTHER PUBLICATIONS

Hunter, R.S., "Conversion of Visual to Instrumental Measurement of Yellowness," J. Am. Oil Chem. Soc. May 1981, vol. 58, No. 5, pp. 608–612.

Simpson, L.A., "Yellowing of alkyd paints films," J. Oil Chem. Assoc. (JOCCA) vol. 64, No. 12, Dec. 1981, pp. 490–498.

Valpola, Jouko, and Simpson, L.A., Letters to the Editor Concerning "Yellowing of alkyd paint films," J. Oil Col. Chem. Assoc (JOCCA), vol. 65, No. 5, May 1981, pp. 199–200.

Primary Examiner—Carroll B. Dority
Attorney, Agent, or Firm—Fitzpatrick, Cella, Harper & Scinto

[57] ABSTRACT

A surface lighting device receiving incident rays through two opposing faces of a light guide from light source to emit the incident rays from a face different from the two faces. The light guide is divided into plural divisions which are jointed together.

12 Claims, 19 Drawing Sheets

JUNCTION BETWEEN DIVIDED SURFACES

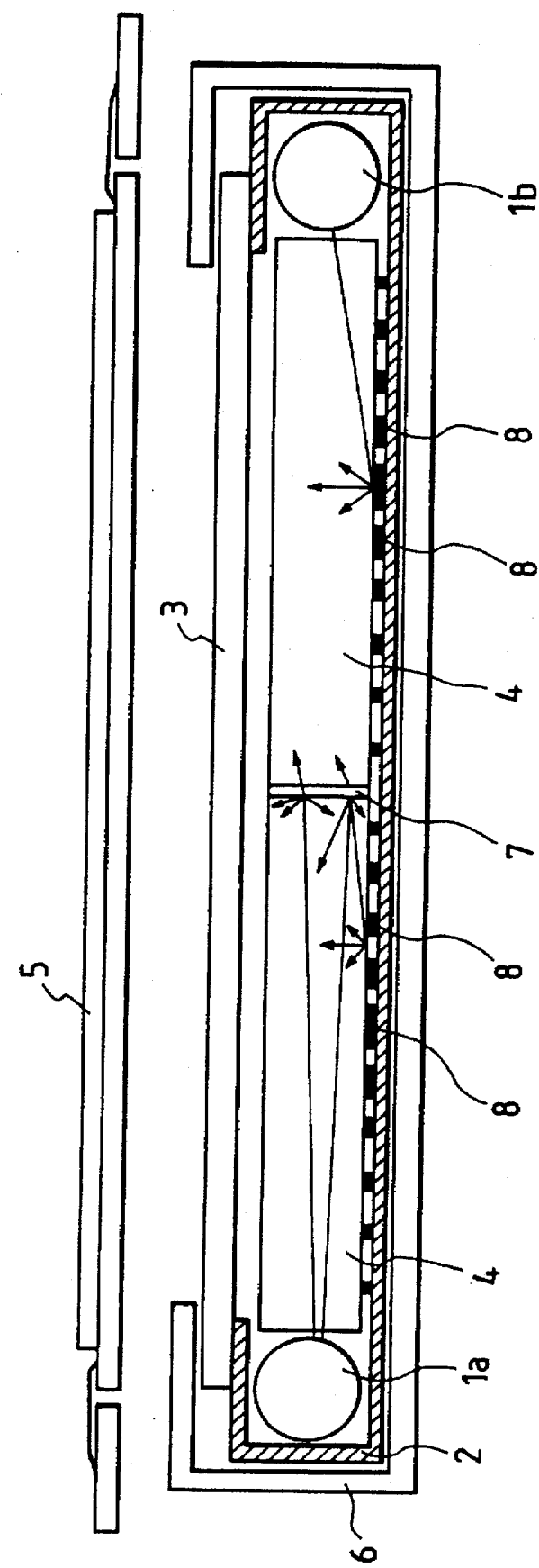

JUNCTION BETWEEN DIVIDED SURFACES

JUNCTION BETWEEN DIVIDED SURFACES

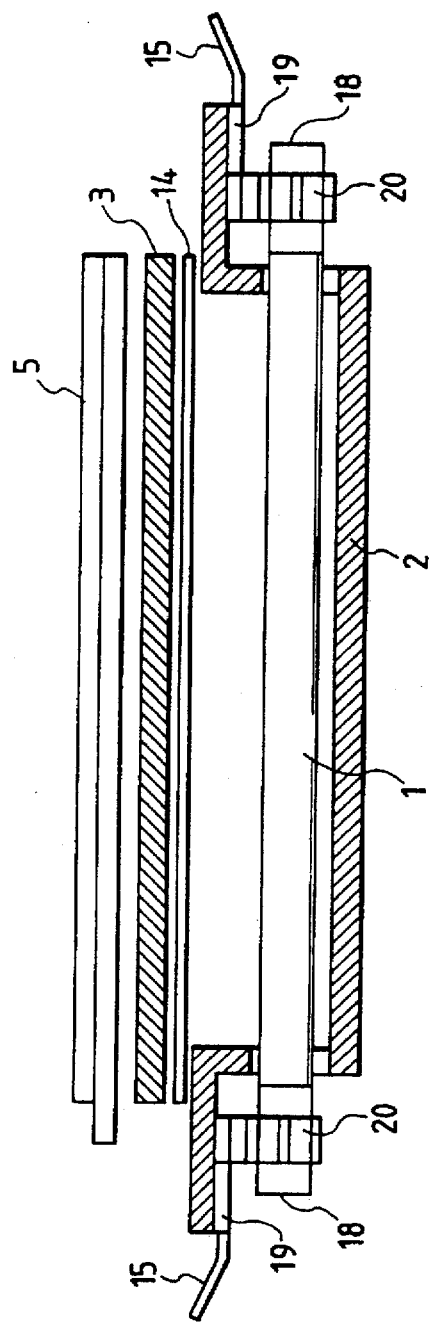
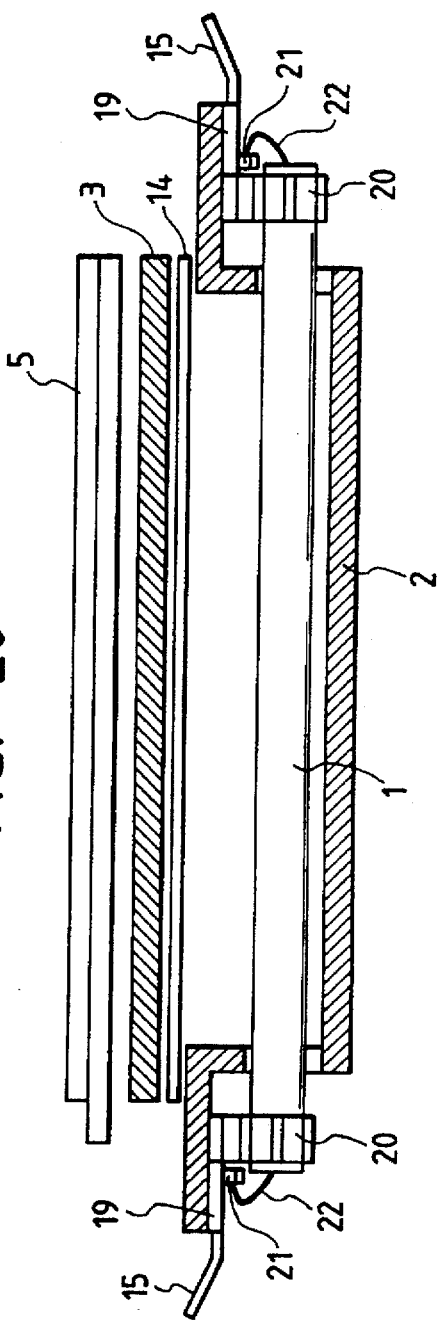

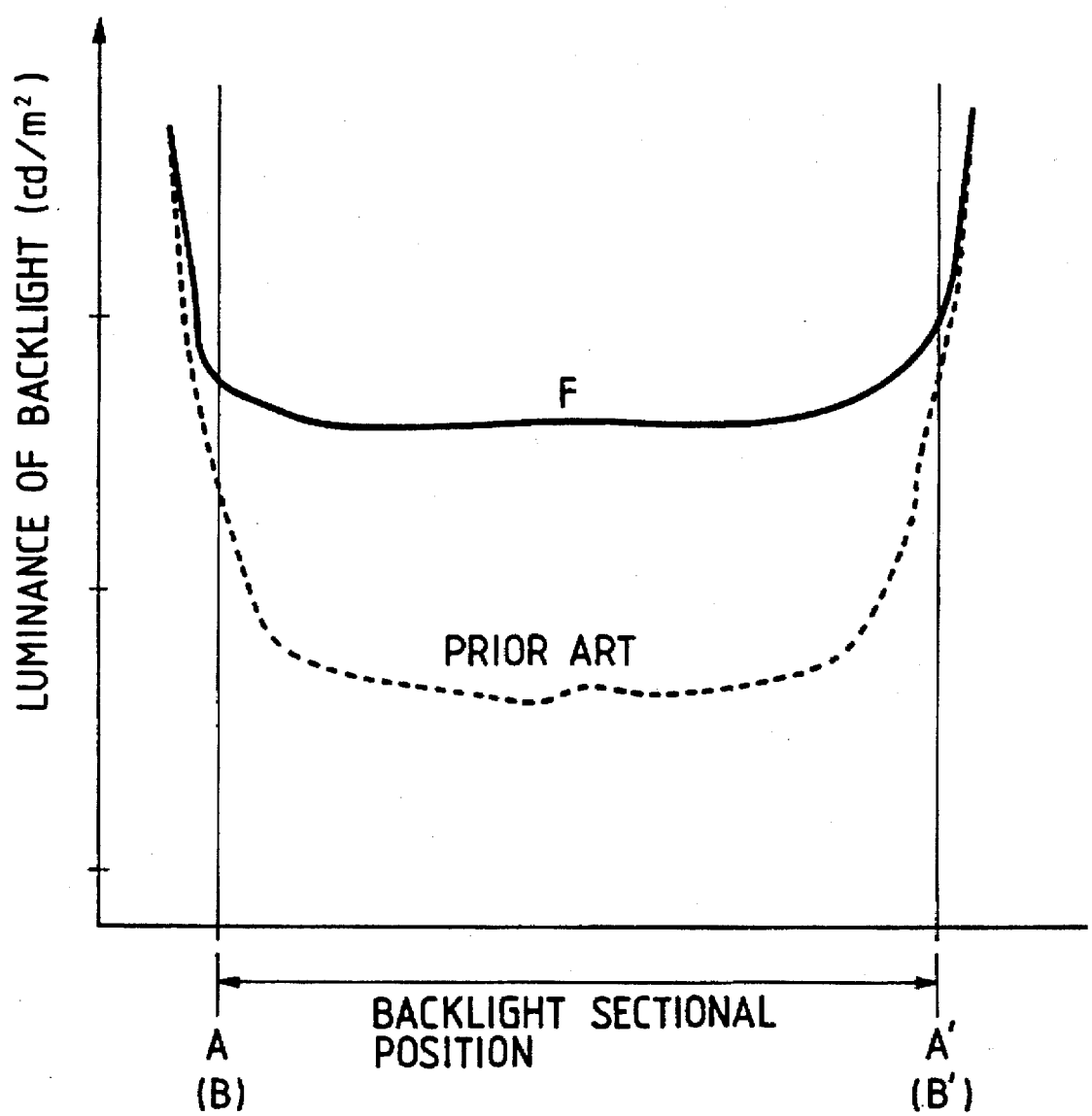

1

SURFACE LIGHTING DEVICE AND A DISPLAY HAVING SUCH A LIGHTING DEVICE

This application is a division of application Ser. No. 07/984,836 filed Dec. 3, 1992, now U.S. Pat. No. 5,438,484.

BACKGROUND OF THE INVENTION

1. Field of the Invention

The present invention relates to a surface lighting device and a display having such a lighting device. More particularly, the invention relates to a surface lighting device preferably used for a backlight device for backlighting a liquid crystal display and other displaying apparatuses, and a display having such a surface lighting device.

2. Related Background Art

A surface lighting device is capable of emitting light evenly over a wide area. It is thus applicable as various lighting means.

Particularly, since a liquid crystal itself does not emit any light in the liquid crystal display or the like, it is usually practiced to light up the liquid crystal panel from its rear side using a light source in order to improve the display conditions for an easier observation of the displayed images.

For a desirable surface lighting device serving as a backlight source of the kind, it is required and the luminance is even for the light emitting surface, that is, at least the area corresponding to the entire display surface of the display, and that the apparatus is small and light in weight as well as the lighting efficiency is high for its power consumption.

Also, when this surface lighting device is adopted as a display, its mode should preferably be such that the display can be fabricated thin as a whole.

As a surface light device which can satisfy such requirements, there is known the surface light device of an edge type using semiconductors, and as a display having such a surface lighting device, there is known the display which is represented in a schematically cross-sectional view in FIG. 1.

In FIG. 1, reference numerals 1a and 1b designate light sources; 2, a reflection board; 3, a diffusion board; 4, a light guide; 5, a liquid crystal display panel; 6, an outer housing; and 8, a diffusion reflection pattern.

FIG. 2 is a plan view schematically showing a surface lighting device used for the display shown in FIG. 1, which is observed from the light emitting side (from the side where the liquid crystal display panel is mounted).

In FIG. 2, a reference numeral 9 designates lamp leads; 10, lamp electrode portions; 11, a lamp emission portion; and 12, the effective emission surface of the surface light device.

FIG. 1 is a cross-sectional view schematically showing the display taken along B–B' in FIG. 2.

The surface lighting device shown in FIG. 1 and FIG. 2 is provided with the light sources 1a and 1b with the light guide 4 therebetween. Also, the diffusion reflection pattern 8 is provided on the side opposite to the light emitting surface of the light guide 4. Then, there is provided the reflection board 2 which has an opening encircling the aforesaid light sources 1a and 1b, light guide 4, and diffusion reflection pattern 8. Also, the diffusion board 3 is arranged above the opening of the reflection board 2. The outer housing 6 is arranged to encircle the reflection board 2 with its opening portion provided corresponding to the opening of the aforesaid reflection board 2.

For the light guide 4, the above-mentioned surface lighting device has a transparent member made of a glass or plastic material such as acrylic resin, and the incident rays of light from the light sources 1a and 1b through the sides of the light guide 4 are emitted from the front face of the light guide 4 after being uniformalized through the reflection board 2 and diffusion board 3.

The light sources 1a and 1b are arranged at both ends of the effective light emission surface 12 to place it between them. The luminous fluxes emitted from the light sources 1a and 1b enter the light guide 4 made of transparent acrylic resin or the like. Then, the structure is arranged so as to guide them to the center as much as possible through the reflection pattern portion 8 on the reverse side of the light guide 4 and the reflection board 2.

Also, the diffusion reflection pattern portion 8 is arranged more densely further away from the light source 1a or 1b. It is thus attempted to guide the incident rays of light to the central portion of the light guide 4.

In this respect, FIG. 3 is also a cross-sectional view schematically showing the display having the surface lighting device taken along the same position as FIG. 1. In FIG. 3, what differs from FIG. 1 is that the light guide 4 has a curvature on each side of the light sources 1a and 1b to match the configurations of the light sources 1a and 1b. In this way, it is implemented to enable the rays of light from the light sources 1a and 1b to enter the photoconductor more effectively as well as to make the device compact.

However, as described above, the surface lighting device of an edge type has a low luminance in the central portion between the light sources and a high luminance in the vicinity of the light sources as indicated by a broken line C shown in FIG. 9. This is because the light sources 1a and 1b emit diffusion light and make the vicinity of the light sources 1a and 1b bright while the light emitted from the light sources 1a and 1b mostly reach the opposite light source 1b and 1a to be diffused, respectively, thus making the vicinity of the light sources 1a and 1b brighter. As a result, it is inevitable that the effective light range (effective emission surface) of the foregoing lighting device will become narrower because its overall luminance must be adjusted to match evenly as a backlight with the lowered luminance between the central portion between the light sources 1a and 1b. Thus, a problem is encountered that the light utilization efficiency for the apparatus as a whole is reduced.

Also, in order to intensify the luminance in the central portion between the light sources, there are disclosed in Japanese Utility Model Laid-Open Application No. 63-8703 and Japanese Patent Laid-Open Application No. 01-91955 methods to guide luminous fluxes to the central portion by providing a lower recess or an upper recess for the central portion of the photoconductor as shown in FIG. 4A and FIG. 4B. According to these methods, it is possible to intensify the luminance of the back lighting device for the central portion between the light sources as indicated by the dotted line B in FIG. 9. However, since the configuration of a photoconductor of the kind is uneven, it takes a long period of time to complete a molding cycle when it is molded without any adverse effects such as warping. The larger the light guide, the longer becomes such a period of time. In consideration of productivity, these methods are not realistic. Also, when the light guide is produced by cutting, there are still the problems of warping and unevenness of grinding finish among others. The machining which can avoid them is costly and this is not realistic, either.

In the conventional example, therefore, it is required to use a light source having all powerful luminous fluxes to intensify the luminance all over the backlight source. Accordingly, the light source itself becomes large, resulting in a thick liquid crystal display or the increased power consumption requires more capacitance to necessitate the use of larger light source. The heat generation of the light source itself becomes great to make it necessary to provide an additional heat releasing arrangements for the liquid crystal display. There are some other problems. Moreover, in recent years, there are demands on the larger panel of liquid crystal display or color liquid crystal display which has a problem with transmittivity. To meet these demands, the above-mentioned problems become more significant and serious.

Also, in order to increase the light emission area more or intensify the emission luminance more for the expansion of the display area, the implementation of color display, or a better visivility of display, it is conceivable to provide the light sources 1a and 1b not only on one opposing sides of the light guide 4, but also on the other opposing sides thereof. Now, in conjunction with FIG. 5 and FIG. 6, Such an example will be described.

FIG. 5 is a cross-sectional view schematically showing a display as in FIG. 1. Also, FIG. 6 is a perspective view schematically showing the relations between the arrangements of the light sources 1a, 1b, 1c, and 1d and the light guide 4. In this respect, FIG. 5, illustrates the display sectionally at a position corresponding to the position taken along C–C' in FIG. 6. In FIG. 5 and FIG. 6, the same reference numerals as in FIG. 1 designate the same elements. Here, therefore, descriptions will be omitted for such elements.

In FIG. 5 and FIG. 6, the four light sources 1a to 1d are arranged along the four sides of the light guide 4 in a configuration of a board. However, if there is no diffusion reflection pattern portion 8 present, most of the luminous fluxes emitted from the light source 1a on the left-hand side in FIG. 5, for example, repeat critical reflections. These fluxes are guided to the liquid crystal display panel 5 side while repeating diffusion reflections or secondary reflection due to the surface of the opposing light source 1b side and are attenuated. Also, even if a diffusion reflection pattern 8 is provided for the reverse side of the light guide 4, most of luminous fluxes are guided to the liquid crystal display panel 5 side due to diffusion by the diffusion board 3 in the vicinity of the light source 1a or are diffused by the surface of the light source of the light source 1b side to be guided to the liquid crystal display panel 5 side. As a result, the luminance is low on the upper panel surface side in the vicinity of the central portion of the surface lighting device between the opposing light sources 1a and 1b. In addition, there is a problem that the backlight becomes uneven having a high luminance in the vicinity of the light sources.

In other words, as shown in FIG. 5, the luminous flux Z is not related to the diffusion reflection pattern portion 8. This reaches the light source 1b on the opposite side to increase the luminance in the vicinity of the light source 1b. Also, the light flux Y is substantially reflected critically (light fluxes less than the critical angle being totally reflected) on the upper surface of the light guide 4. Thus, this is not related to the diffusion reflection pattern portion 8, either. Therefore, it causes the luminance to be increased likewise in the vicinity of the light source 1b. In other words, in a usual backlight device of an edge type, it is difficult to intensify the luminance in the central portion between the light sources 1a and 1b according to FIG. 5. Accordingly, the device is designed to intensify the luminance in the central portion between the light sources 1a and 1b by the application of the diffusion reflection pattern portion 8 provided for the reverse side of the light guide 4. For the same reasons as described earlier, it is still impossible to intensify the luminance in the central portion between the light source sufficiently. The light emitted from the light source 1a reaches the light source 1b on the opposite side. It is thus diffused by the end face of the light guide 4 on the opposite light source 1b side to make the vicinity of the light source 1b brighter; hence creating a significant difference in luminance in the central portion between the light sources and the vicinity of the light sources.

In this case, in order to control the luminance in the portion near the light sources where the luminance becomes high, it may be necessary to elongate further the distance from the effective display surface to the light sources 1a and 1b. The ratio (effective efficiency of the light sources) to the total luminous fluxes which can be utilized on the panel face side against the entire luminous fluxes of the light sources becomes smaller still. Therefore, powerful light sources having all luminous fluxes should be employed to intensify the luminance of the backlight sources as a whole. Then, many problems are encountered such as the increased thickness of the entire body of the liquid crystal display due to the light sources themselves which are inevitably made larger, the necessity of a larger capacitance attributable to the increase of the power consumption, the increase amount of heat generated by the light sources themselves, and the necessity to countermeasure the heat generation of the liquid crystal display. In addition, the transmissivity is lowered as the liquid crystal display panel is made larger or the adoption of color display. These problems described above are now more significant and serious.

SUMMARY OF THE INVENTION

In consideration of the above-mentioned problems, the present invention is designed. It is an object of the invention to provide a surface lighting device of an edge type which can be fabricated thin at a low cost even for a large size with an excellent evenness and efficiency of luminance, and a display having such a surface lighting device.

It is another object of the present invention to provide a surface light device capable of improving the evenness of and efficiency of luminance, and a display having such a surface lighting device.

It is still another object of the present invention to provide a surface lighting device capable of improving the positional precision of the light sources for the reflection board, diffusion board, light guide, light curtain, and others to implement the even distribution of backlight luminance as well as to enable only the light sources to be replaced for the implementation of cost reduction, and a display having such a lighting device.

It is a further object of the present invention to provide a surface lighting device capable of preventing occurrence of any color unevenness while in a long term use, and a display having such a surface lighting device.

It is still a further object of the present invention to provide a surface lighting device of an edge type capable of intensifying the luminance in the portion where the low luminance exists (the central portion of the effective emission surface and the portions away from the light sources, for example), which can be fabricated thin at a low cost with even luminance and is particularly suitable as a backlight device for a liquid crystal display or the like, and a display having such a lighting device.

It is another object of the present invention to provide a surface lighting device which receives the light from the light sources through two opposing faces of a light guide respectively, and emits the foregoing incident light through the other face, and a display having such a surface lighting devices, wherein foregoing light guide is divided into a plurality of divisions which are joined together.

It is a further object of the present invention to provide a surface lighting device provided with light sources having leads and a reflection board with the light sources being fixed thereto, and display having such a surface lighting device, wherein clip type members mounted on the reflection board with spring capability are provided to fix the light sources and leads to the reflection board therethrough.

It is still a further object of the present invention to provide a surface lighting device provided with light sources and a reflection board to reflect the light emitted from said light sources forward, and a display having such a surface light device, wherein the color of the reflection board is defined against standard color within a range of −2.0 to 0 at a value $\Delta b^*$ in a chromatic space of CIE 1976L* a* b*.

It is another object of the present invention to provide a surface lighting device with a transparent solid state material as its light guide having a configuration of substantially square when observed from its front to emit the incident light received through the faces of the light guide to the front side of the light guide by uniformalizing the incident light through the reflection board and diffusion board, and a display having such a surface lighting device, wherein there are provided four light sources arranged respectively along the four side faces of the light guide to allow the light to enter the light guide through its side faces, and of the four light sources, the light sources arranged on the two opposing sides of the light guide have a longer length of the effective emission portion of the light sources than that of the effective emission surface of the surface lighting device while those on the other two opposing sides have a shorter length of the effective emission portion of the light sources than that of the effective emission surface of the surface lighting device.

BRIEF DESCRIPTION OF THE DRAWINGS

FIG. 7, FIGS. 11A and 11B, FIGS. 12A and 12B, FIGS. 13A and 13B, and FIG. 15 are cross-sectional views schematically illustrating the relationship between the light guide and light sources according to the present invention.

FIG. 17, FIG. 19, and FIG. 20 are schematically sectional views for the explanation of light source mountings, respectively.

FIG. 28 is a graph showing the luminance characteristics of the surface lighting device shown in FIG. 26.

DETAILED DESCRIPTION OF THE PREFERRED EMBODIMENTS

In order to achieve the above-mentioned objects, the light guide is divided in a surface lighting device where the rays of light from light sources are allowed to enter the opposing side faces of a transparent light guide and emitted to the front side of the light guide after the incident rays of light are uniformalized through a reflection board and/or a diffusion board according to the present invention.

In this way, it is possible according to the present invention to provide a surface lighting device which can be fabricated thin even when it is large at a low cost with a desirable evenness of luminance and an excellent light utilization efficiency.

Hereinafter, with reference to the accompanying drawings, the detailed description will be made of a surface lighting device according to the present invention.

Figure 8:
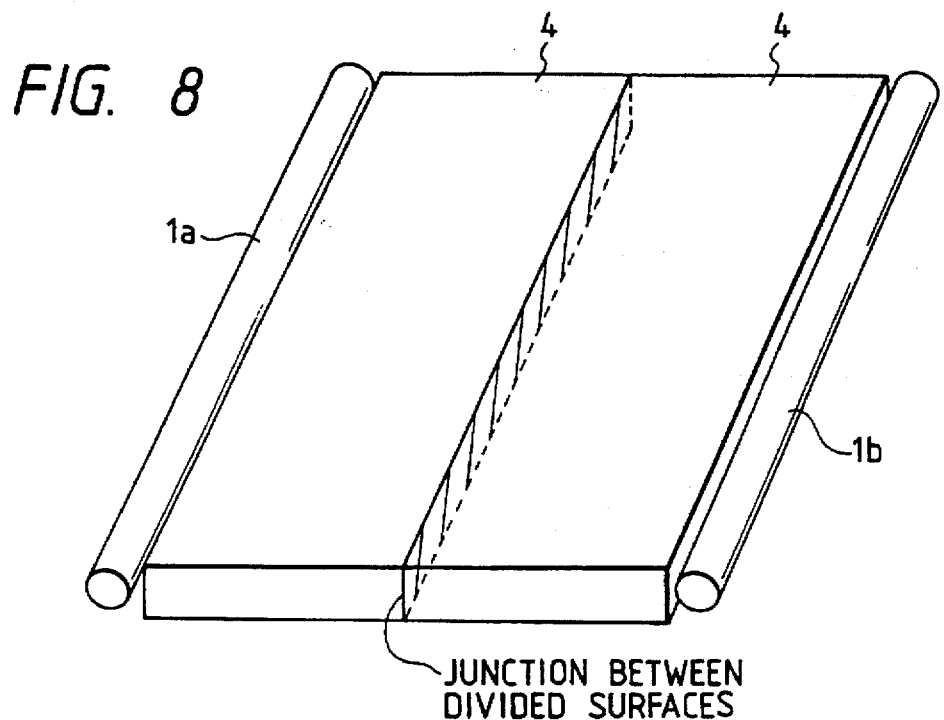
FIG. 8, FIG. 14, and FIG. 16 are perspective views schematically illustrating the relationship between the light guide and light sources according to the present invention, respectively.
Figure 9:
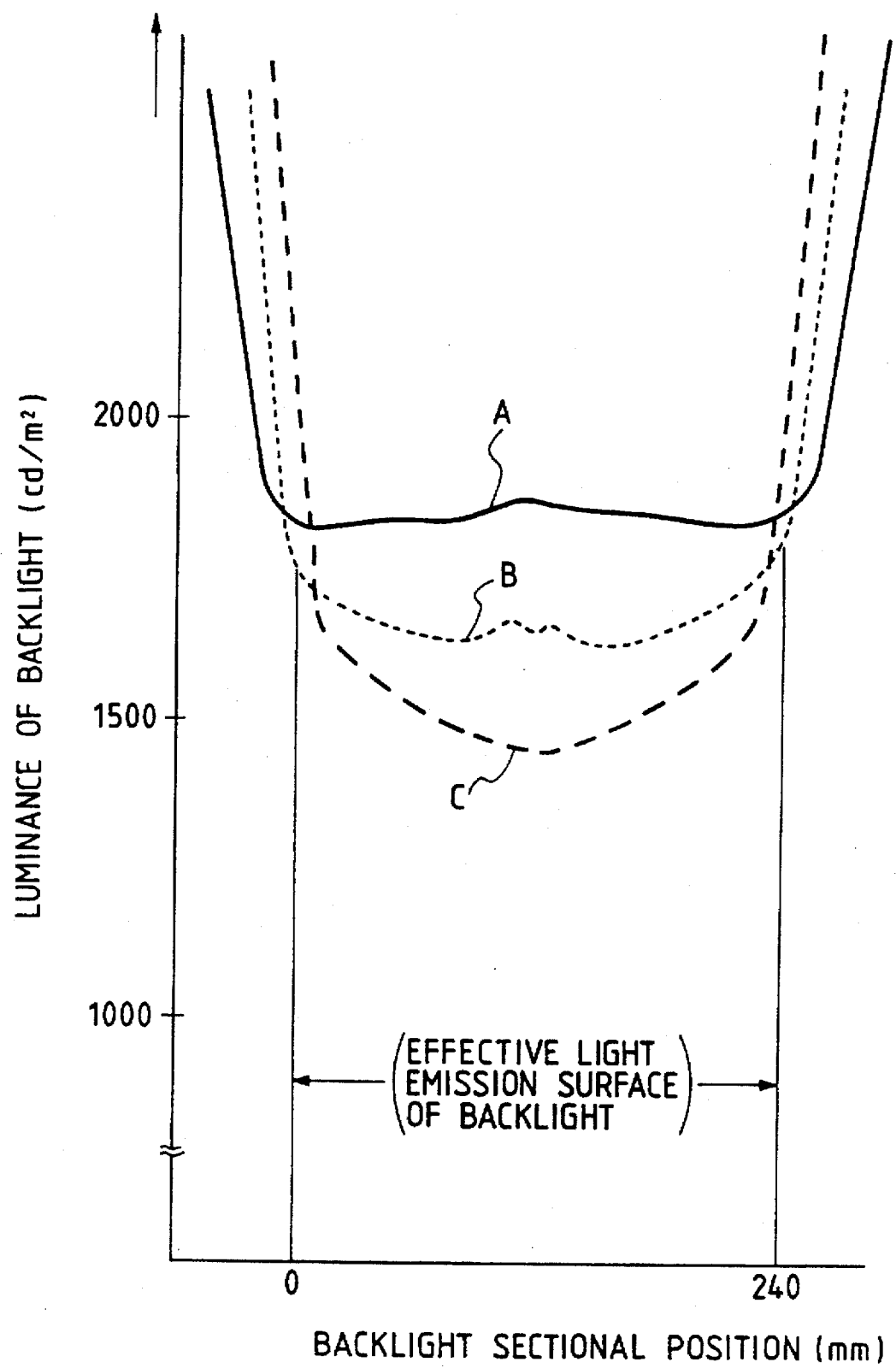
FIG. 9 is a graph illustrating the luminance characteristics of a surface lighting device.
Figure 10:
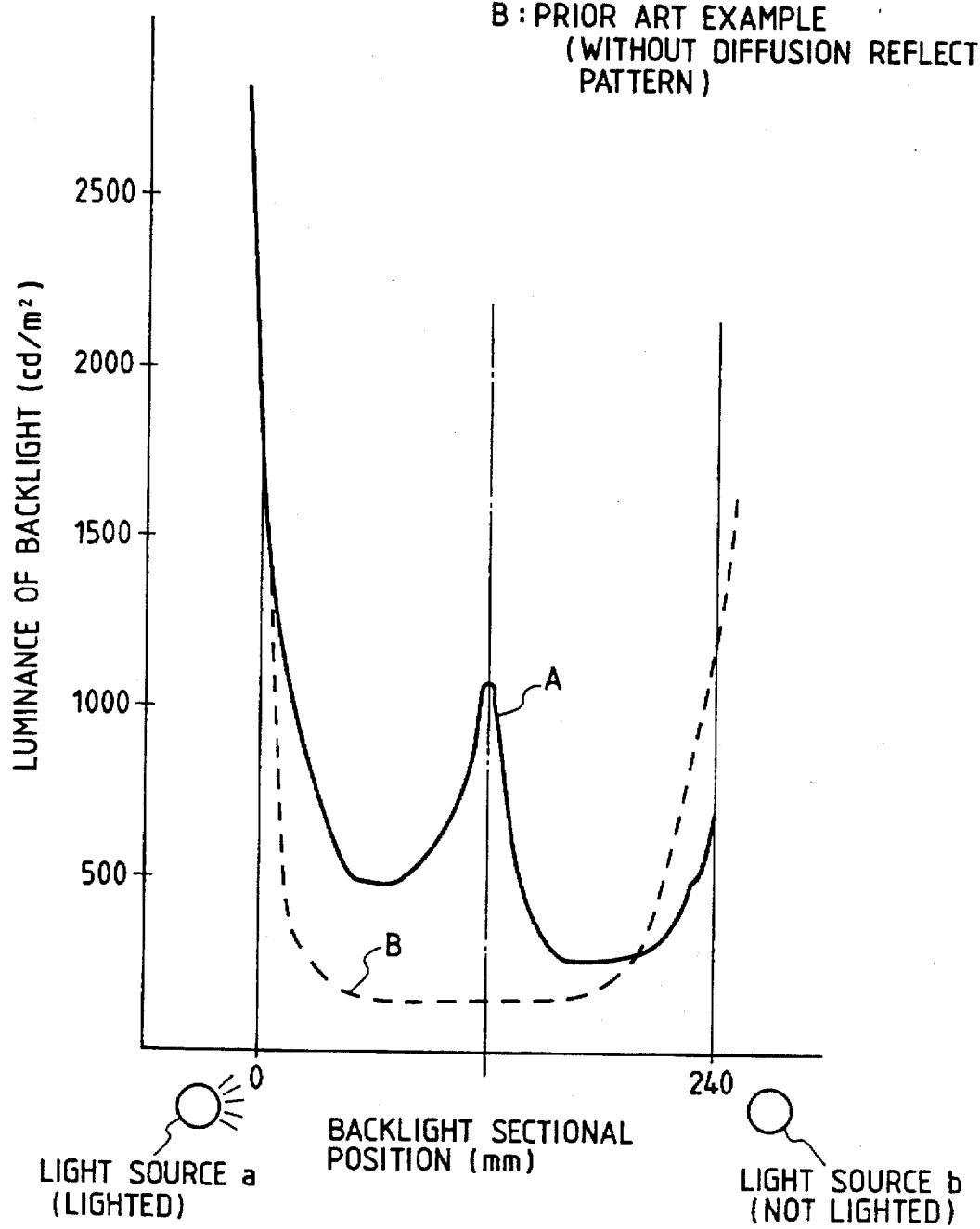
FIG. 10 is a graph illustrating the luminance characteristics for the explanation of a surface lighting device according to the present invention.

FIG. 7 and FIG. 8 are views showing the structure of a liquid crystal backlight device according to a preferable embodiment according to the present invention. Also, FIG. 9 and FIG. 10 represent the luminance characteristics on the surface of a surface lighting device for the explanation of the function of a surface lighting device according to the present invention.

According to an embodiment of the present invention, as shown in FIG. 7 and FIG. 8, a light guide 4 is divided in the central portion of the opposing light sources 1a and 1b. Then, the divided portions are bonded by a transparent adhesives 7. With a structure such as this, the luminance on the light emission surface presents the luminance characteristics as indicated by a solid line A in FIG. 9, Here, in FIG. 9, the dotted line B shows the luminance characteristics of a conventional device (V-letter shaped light guide) shown in FIGS. 4A and 4B and the broken line C shows the luminance characteristics of a conventional device (flat light guide) shown in FIG. 1.

Figure 1:
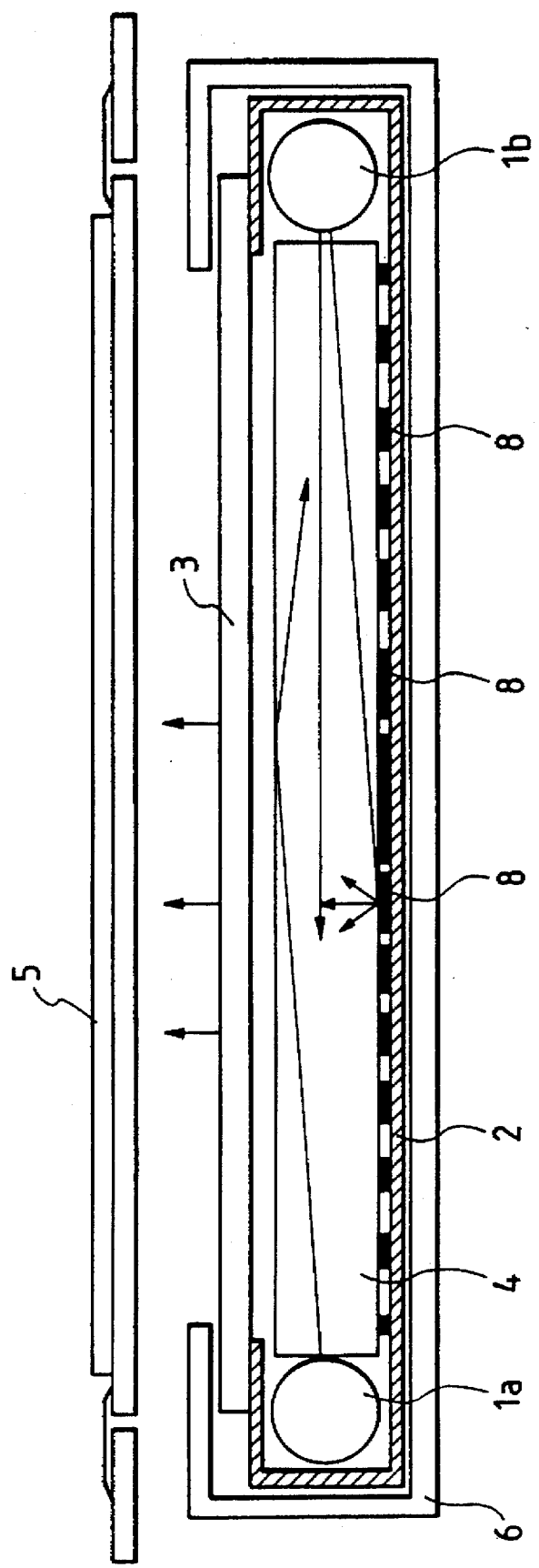
FIG. 1, FIG. 3, and FIG. 5 are cross-sectional views schematically showing displays, respectively.

Now, compared to the conventional example, the description will be made of the principle of the present invention. At first, in a conventional backlight of an edge type, the luminous fluxes emitted from the light sources 1a and 1b are allowed to enter a light guide 4 made of a transparent acrylic resin or the like as shown in FIG. 1 and then guided to the central portion through the foregoing light guide 4, a reflection board 2 on the reverse side, and a diffusion reflection pattern portion 8 formed by densifying the portion away from the light sources 1a and 1b. However, its characteristics are such that the luminance close to the light sources becomes high whereas it becomes low in the central portion between the light sources as shown in the characteristics C represented in FIG. 9 for the reasons described earlier. This is due to the fact that it is impossible to intensity the luminance in the central portion between the light sources only by the diffusion reflection pattern portion on the reverse side of the light guide 4, and that the incident rays of light reach the light sources 1a and 1b on the opposite side and are diffused by the opposing light sources 1b and 1a to make the vicinity of the foregoing light sources 1b and 1a brighter; thus resulting in a significant difference in the luminance in the central portion between the light sources and the vicinity of the light sources. When the diffusion reflection pattern portion 8 is removed and one of the light source 1a of those 1a and 1b is illuminated, most of the luminous fluxes from the light source 1a (illuminated side) reach the opposing light source 1b (not illuminated) clearly as indicated by the characteristics B shown in FIG. 10, for example. FIG. 10 shows the luminance characteristics when the conventional device shown in FIG. 1 and the embodiment of the present invention shown in FIG. 7 are operated respectively without the diffusion reflection patterns 8 on the reverse side of the light guide 4 and only with the light source 1a being illuminated.

According to a first embodiment of the present invention, as shown in FIG. 7 and FIG. 8, the light guide 4 is divided in the central portion between the opposing light sources 1a and 1b. When the light guide 4 is divided in such a manner, the luminous flux from the light source 1a (illuminated) side is reflected in the vicinity of the divided surface in the aforesaid central portion so as to cause the luminance in the central portion between the light source 1a on the light source 1a side and the divided surface to be intensified, and then, the transmitting light through the aforesaid divided surface enables the luminance in the central portion between the light source 1b on the opposite side and the divided surface to be intensified with the aforesaid divided surface as the secondary light source as represented by the characteristics A shown in FIG. 10. Now, the diffusion reflection pattern portion 8 is provided for the reverse side of the light guide 4. By densifying this diffusion reflection pattern portion 8 more as the distances from the light sources 1a and 1b and the divided surface become longer, it is possible to intensify the luminance in the intermediate portion between the light sources and the divided surface more as represented by the characteristics A shown in FIG. 9. The density of the diffusion reflection pattern can be optimized by the luminance on the divided surface side which is determined by the optical characteristics of the divided surface such as the luminance and reflection on the light source side, transmission, diffusion, refraction. Compared to the prior art, the overall luminance is improved by making the luminance in the central portion between the light sources brighter as represented by the characteristics A shown in FIG. 9.

Figure 11A:
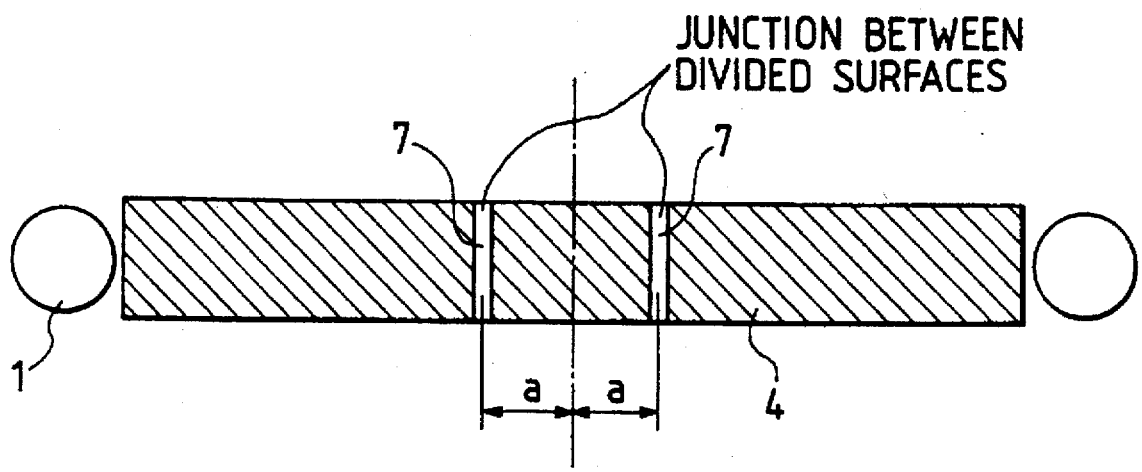
Figure 11B:
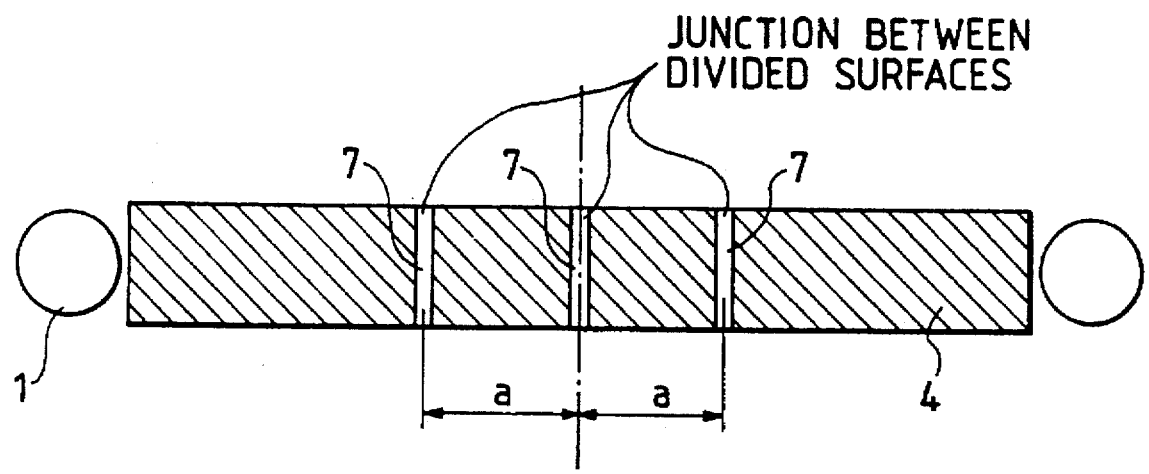

As shown in FIG. 11A and 11B, in an embodiment of the present invention, the light guide is divided into three, four, or more divisions with the central portion of the light guide as the symmetrical axis. By increasing the number of divisions in such a manner, it is possible to make the luminance more even not only in the central portion, but also in the entire periphery near the central portion.

In other words, it may be possible to divide the light guide 4 in the portions equally away from the central portion of the light guide by a distance a, and the divided portions are bonded by adhesives 7 as shown in FIG. 11A or as shown in FIG. 11B, the light guide 4 is divided respectively in the central portion of the light guide 4 and in the portions equally away from the foregoing central portion by distance a, and these divided portions are bonded by adhesives 7.

Figure 12A:
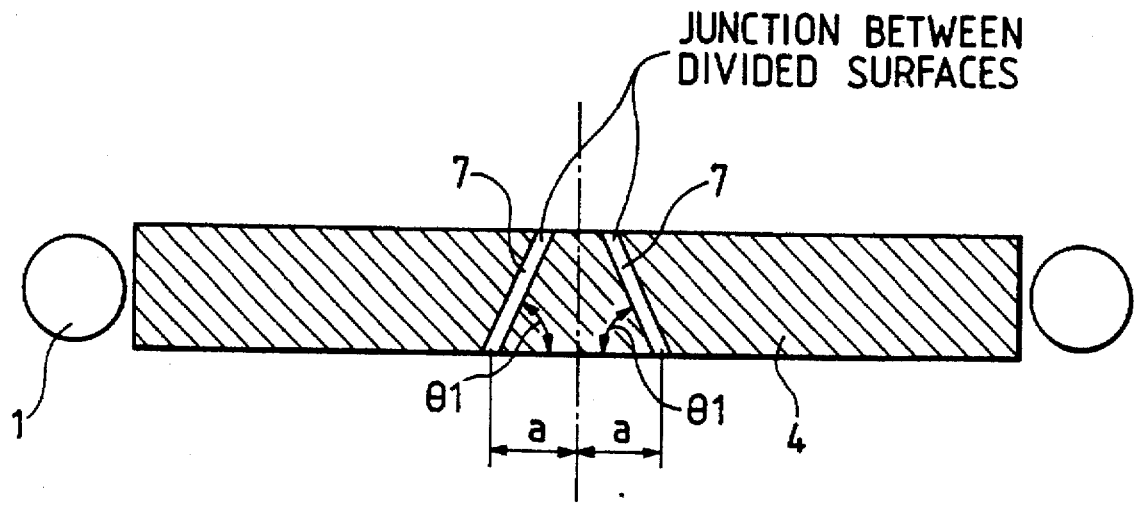
Figure 12B:
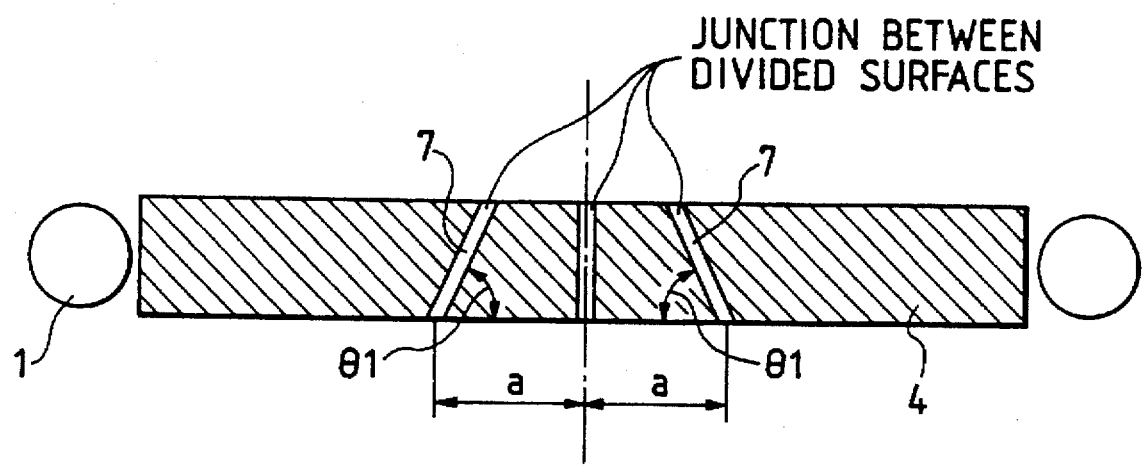

Also, as shown in FIGS. 12A and 12B, regarding the junctions between surfaces, each of them is appropriately set θ1 in a range of 45 degrees to 90 degrees against the horizontal plane (surface or reverse side) of the light guide 4. By slanting the junctions between surfaces, it is possible to obtain an effect to intensify the diffusion reflection from the junctions as required to secure the intended amount of emission.

In other words, the divided surfaces are inclined to the surface of the light guide 4 as shown in FIGS. 12A and 12B. Then, the junctions between surfaces are inclined so as to enable the irradiating amount of light to the surface side to be controlled by setting the slanting angle θ1 appropriately.

In this case, it is desirable to make the slanting angles symmetrical. Here, the same technical thought regarding the dividing positions as in FIGS. 11A and 11B can be given to the inclined junctions between surfaces in FIGS. 12A and 12B.

Figure 4A:
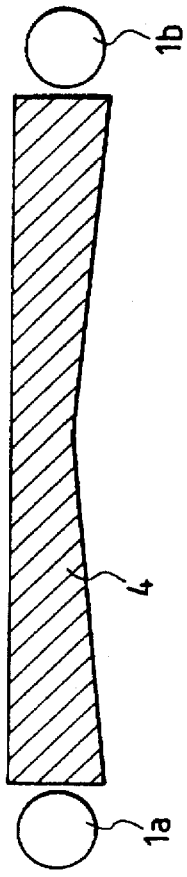
FIGS. 4A and 4B are cross-sectional views schematically illustrating the relationship between the light guide and light sources, respectively.
Figure 4B:
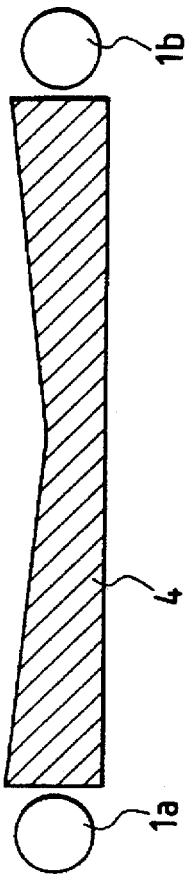
Figure 5:
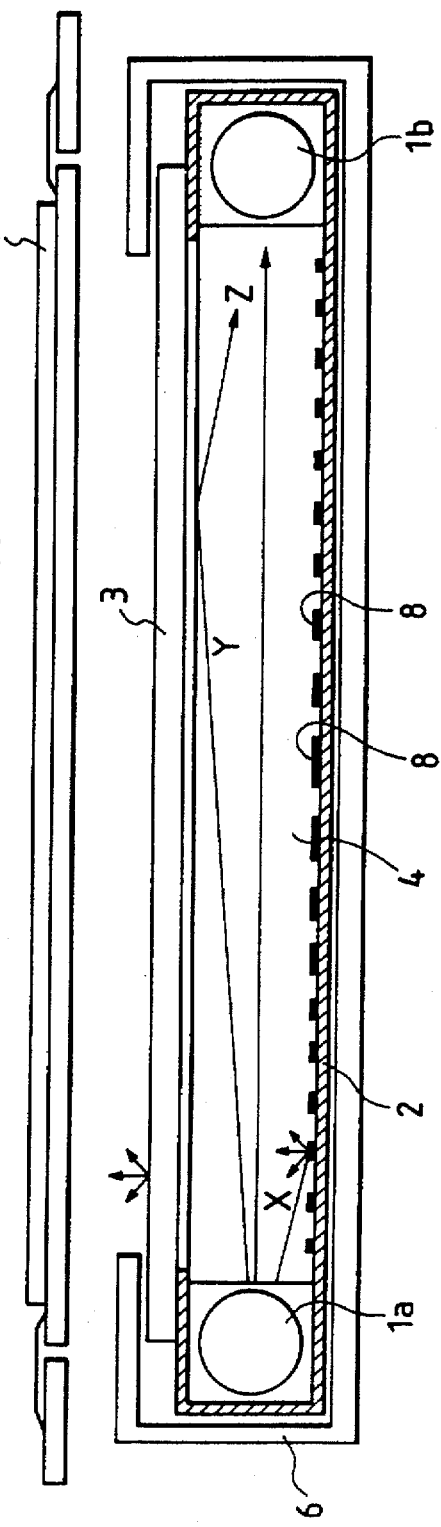
Figure 6:
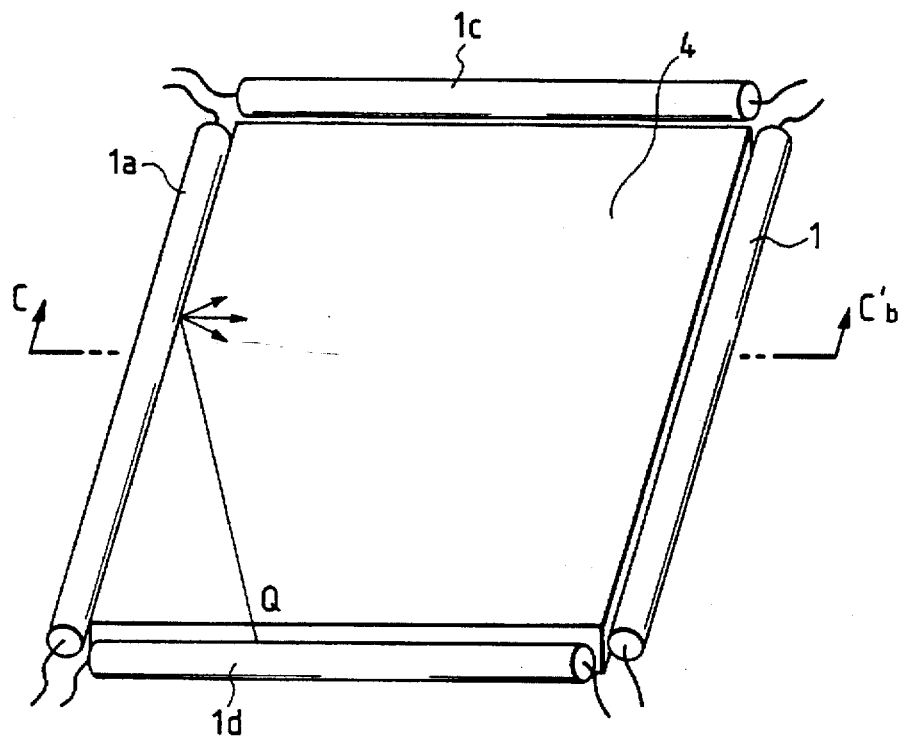
FIG. 6 is a perspective view schematically illustrating the relationship between the light guide and light sources.
Figure 13A:
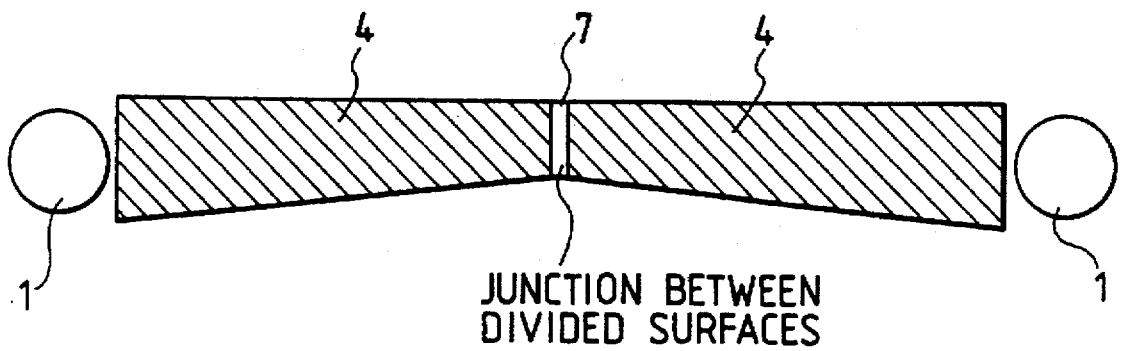
Figure 13B:
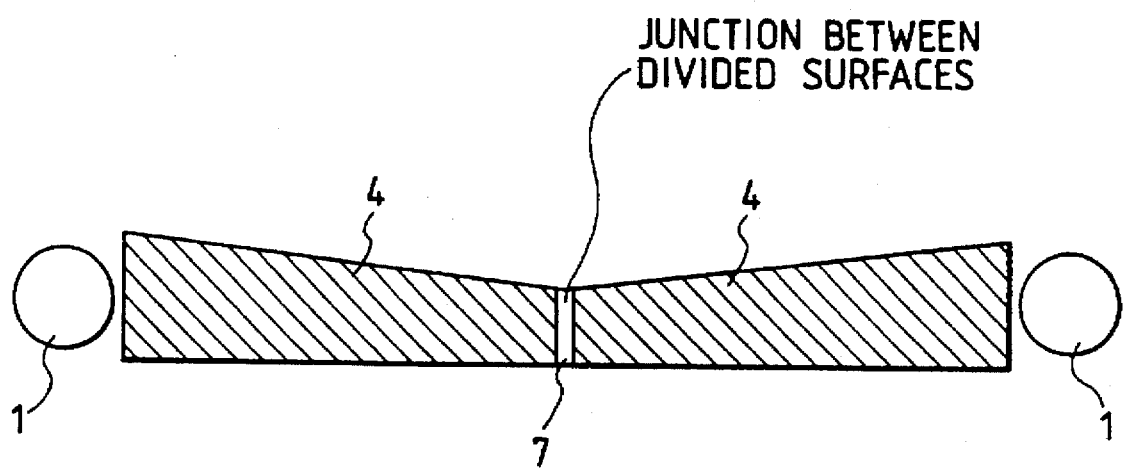

Also, as shown in FIGS. 13A and 13B, the present invention is applicable to the prior art shown in FIGS. 4A and 4B. In other words, the central portion of a light guide is provided with a lower recess and an upper recess by the combination of the prior art and the present invention. Then, by bonding the central portions of the light guide 4, it is possible to diffuse and reflect the luminous fluxes further in the vicinity of the foregoing central portions.

As described above, by dividing the light guide 4, the substantial size of the light guide 4 can be made smaller than that of the light guide which is integrally produced. Accordingly, it becomes possible to make the light guide 4 with a desirable precision even when the surface lighting device is large.

Also, as shown in FIGS. 13A and 13B, even when the thickness of the light guide 4 is varied, not only it is possible to intensify the luminance in the vicinity of the central portion of the light guide 4, but also to solve the problems related to the warping and lower productivity in the prior art by dividing the light guide and joining the divided surfaces.

Figure 14:
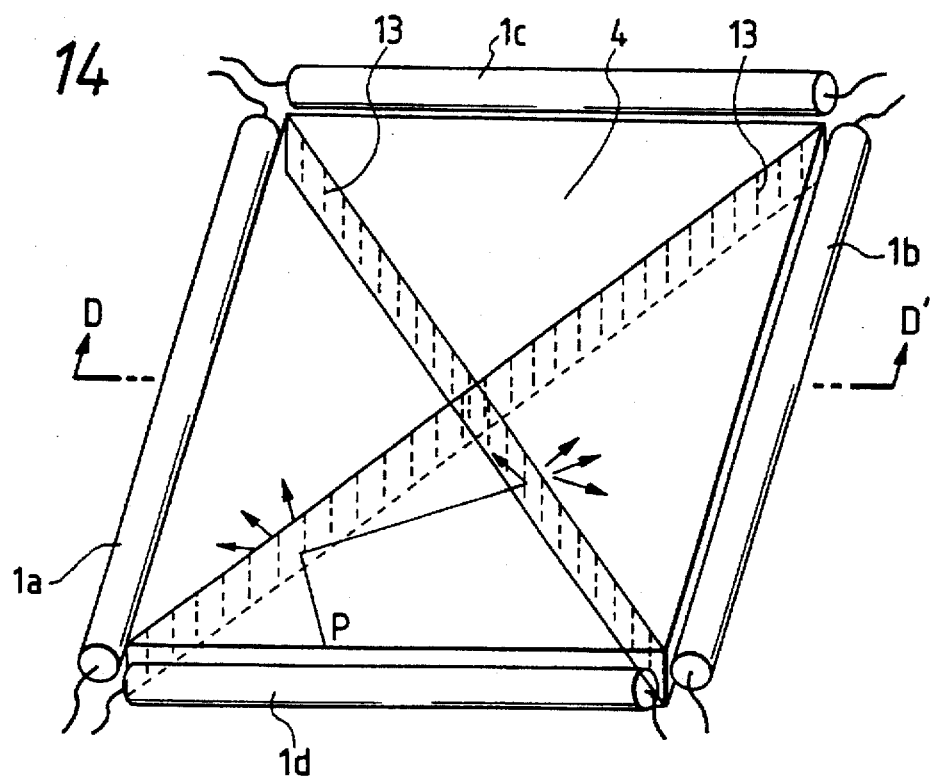
Figure 15:
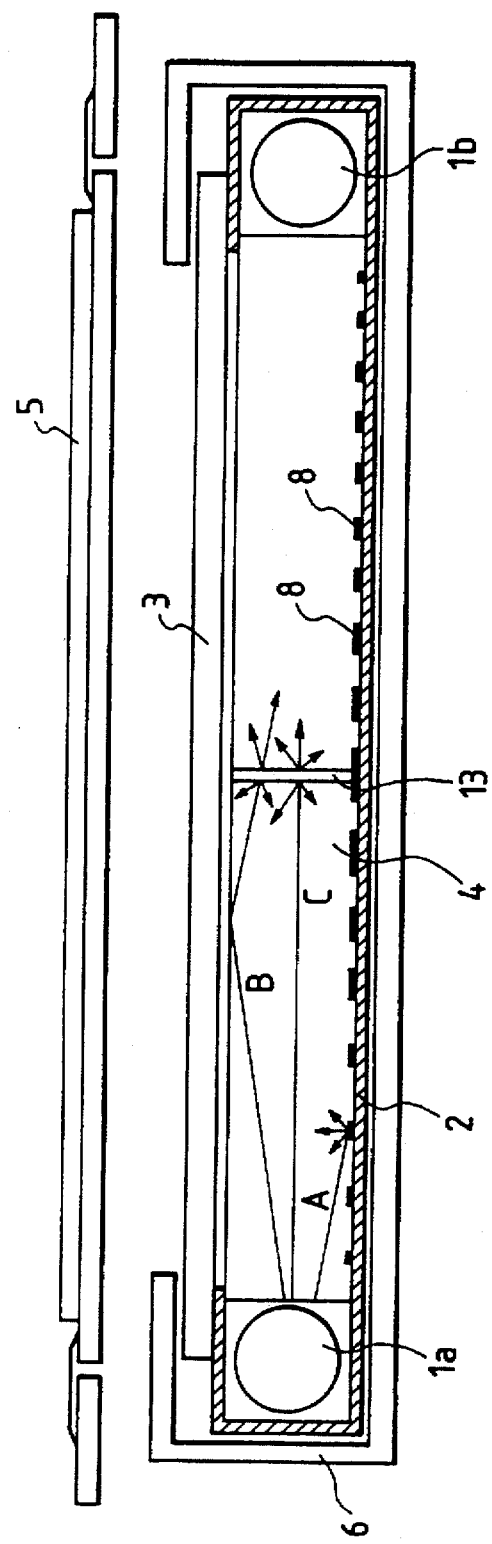

FIG. 14 is a perspective view schematically showing the structure of a surface lighting device applied as a backlight device to a liquid crystal display according to still another preferable embodiment of the present invention. FIG. 15 is a schematically sectional view of a display at a position corresponding to the line taken along D–D' in FIG. 14. In this device, the light guide 4 is divided in the diagonal directions, and the divided surfaces are arranged to be semitransmittable reflection surfaces 13. The other structures are the same as the conventional device shown in FIG. 16 and FIG. 17.

With this structure, luminous flux A is diffused and reflected by the diffusion reflection pattern portion 8 on the reverse side of the light guide 4 in the vicinity of the light source 1a as in the case of the prior art, and is emitted to the liquid crystal panel 5 side, for example. Luminous flux B is once reflected by the surface of the light guide 4, and by the semitransmittable reflection surface 13, it is partly reflected while the remaining part is transmitted. Therefore, there is no possibility that the luminance in the vicinity of the opposing light source 1b is intensified as in the case of the prior art. Regarding luminous flux C, it is partly reflected by the semitransmittable reflection surface 13 and the remaining part is transmitted as in the foregoing case whereas in the prior art, it advances straight to the surface of the opposing light source 1b and is diffused thereby to make the vicinity of the light source 1b brighter. Also, as shown in FIG. 14, luminous flux P, for example, is partly reflected by the semitransmittable surface 13 and the remaining part is transmitted. The luminance in the central portion of the light guide 4 is thus intensified while this event is being repeated.

The density of the diffusion reflection pattern portion 8 on the reverse side of the light guide 4 is such that it is more densified as it is farther away from the light source 1 and should be designed in consideration of the characteristics of the semitransmittable reflection surface 13. Also, the diffusion board 3 is provided on the upper surface of the diffusion reflection pattern 8 and semitransmittable reflection surface 13 so as not to allow them to be distinguished from each other. In this way, it becomes possible to equalize the difference in luminance in the higher luminance portion in the vicinity of the light source 1 and the lower luminance portion in the central portion and to enhance the luminous efficiency substantially all over the entire backlight device.

Figure 16:
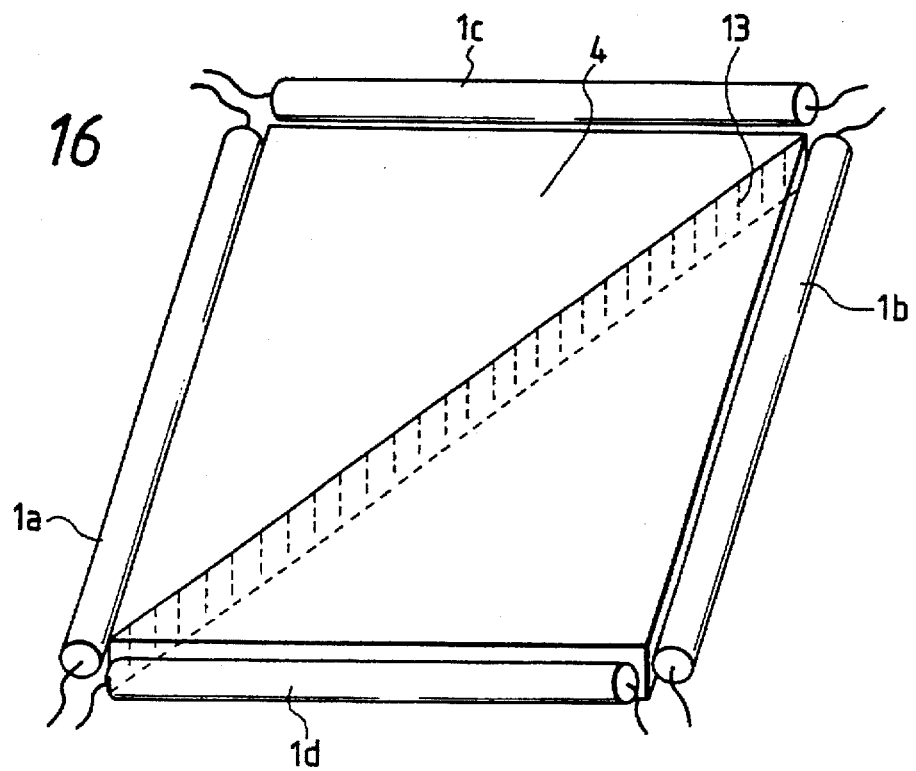

FIG. 16 is a perspective view schematically showing the structure of a liquid backlight device according to still another preferable embodiment of the present invention. As shown in FIG. 16, the light guide 4 is divided in the diagonal directions and the semitransmittable reflection surface 13 is provided only along one diagonal direction. With this arrangement, it is also possible to enhance the luminous efficiency of the backlight device as a whole.

In this respect, there are conceivably various modifications other than those described above for the method to divide the light guide 4 in order to enable the divided portions to be equally conditioned with respect to each of the light sources.

If, for example, light sources are arranged respectively for four sides of the light guide 4, it may be possible to divide the light guide 4 from the central portions of the respective sides toward the central portions of the opposing sides so as to intersect the dividing lines crosswise instead of dividing the light guide diagonally as described above. In a case of dividing the light guide into two, it may be divided at a position which connects the central portions of a pair of sides as shown in FIG. 7 and FIG. 8.

Also, the junctions between surfaces can be inclined as described earlier. Moreover, it may be possible to combine inclined faces and vertical faces by increasing the number of such junctions.

Further, the division of the light guide can be-configured either in point symmetry or linear symmetry as shown in the above-mentioned figures within the scope of the present invention.

Diffusion means includes the diffusion reflection pattern formed on the surface of the reflection board. This pattern should preferably be densified more as it is farther away from the junctions between surfaces. Also, the junctions between surfaces of the light guide should preferably be prepared to be semitransmittable reflection surfaces by adhesion, welding, setting, or the like.

Figure 17:
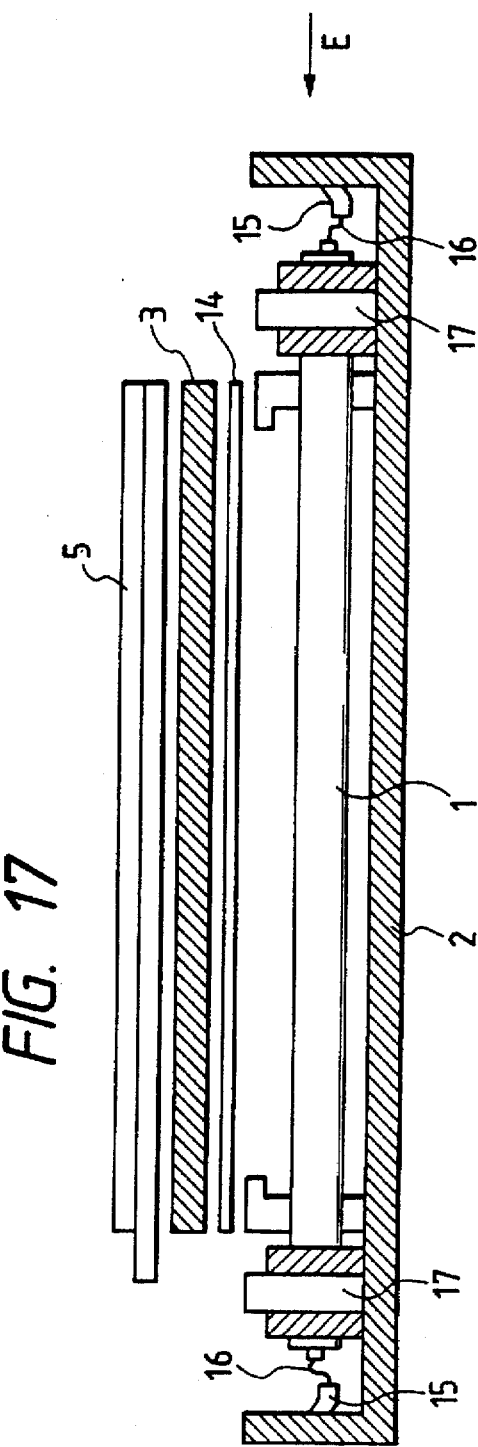
Figure 18:
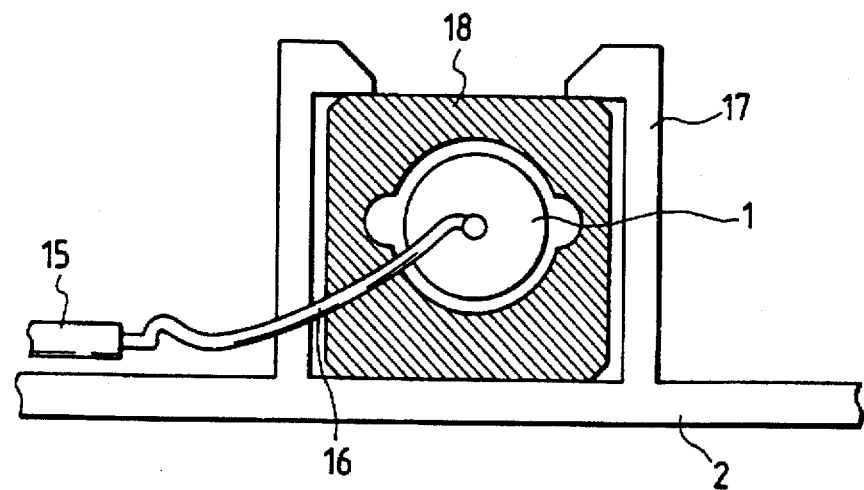
FIG. 18 and FIG. 21 are enlarged views for the explanation of the light source mountings, respectively.

Now, FIG. 17 a cross-sectional view schematically showing an example of the structure of a surface lighting device. In FIG. 17, reference numeral 1 designates a light source (fluorescent lamp) with lamp leads 16 being connected, and are fixed on the reflection board 2 by means of rubber bushes 18, the light source fixing nails 17, and others as shown in FIG. 18 which represents the principal part thereof in enlargement. (FIG. 18 is a schematic view illustrating the light source mounting unit as observed in the direction indicated by an arrow E in FIG. 17). Also, above the light source 1 thus fixed, a lighting curtain 14 formed with patterns to uniformalize the light source luminance, and a diffusion board 3 are arranged. Then, a transmitting type liquid crystal display panel 5 is irradiated from its rear side through these elements. A reference numeral 15 designates leads from a backlight sources which are not shown. The lamp leads 16 are fixed to these leads 15 by soldering.

Also, FIG. 19 is a cross-sectional view showing an example in which a lamp having metallic bases is fixed. A light source 1 with the metallic base portions 18 is fixed to the reflection board 2 with clips 20 having spring capability. Above the light source 1 thus fixed, there are arranged a lighting curtain 14 on which the patterns are formed to uniformalize the light source luminance, and a diffusion board 3 as in the foregoing case. A transmitting type liquid crystal display panel 5 is irradiated from its rear side through these elements. A reference numeral 15 designates lead lines for backlight which is not shown, and the metallic bases 18 of the light source 1 are fixed to the leads 15 by soldering through clips 20 having spring capability.

Here, in FIG. 19, there is shown the example in which no light guide 4 is used just for illustrating the mounting of the light source 1. The light guide 4 which is divided as described earlier is applicable in this mode as a matter of course.

However, in a surface lighting device shown in FIG. 17, the lamp leads 16 and the leads 15 must be soldered after inserting them through rubber bushes 18 when the light source 1 is fixed to the fixing portions of the reflection board 2. This makes the mounting operation difficult. Furthermore, due to the deterioration of the soldered leads, stresses, and the like, the problems related to the maintenance of reliability may still be encountered. Also, the light source 1 is fixed by the rubber bushes 18, light source fixing nails 17 on the reflection board 2, and others. As a result, it is difficult to secure the positioning accuracy for the lighting curtain 14 in the vertical and horizontal directions. Thus, there are some cases where irregularities take place in accuracy attributable to the fluctuations of the precision with which to conduct the positioning. Furthermore, although the light source 1 itself usually uses a luminecent light source (such as fluorescent lamp) which does not require replacements so often, the light source 1 must be replaced after all when approaching its life. Then, as the removal of the light source 1 is difficult, there is a need for replacing the backlight devices as a whole. This may lead to the problems of operation and cost control as well.

Also, for the light guide having the metal bases 18 as shown in FIG. 19, the replacement of the light guide is easy when approaching its life, but the total length of the light source is long for the effective emission portion; thus leading to a larger size of the backlight device inevitably. Also, in the light source having the metal bases, the metal base materials are needed and its installation process is additionally required. This may create a problem that the cost of the light source itself is increased.

These problems are those arising even if the above-mentioned light guide 4 are employed. It is therefore desirable to solve these problems, too, for the provision of a surface lighting device which is fabricated more compactly at a lower cost.

In order to solve these problems, the light source and its leads should preferably be fixed to the reflection board by the use of a clip-shaped member having a spring capability. With such a member, it is possible to enhance the precision of the installation components of the light source installation portion. Accordingly, the interrelated precisions for the installation positions between the light source and the reflection board, light guide, lighting curtain, and diffusion board are improved to make it possible to prevent the unevenness in the total luminance attributable to the installation inaccuracy, Thus, as even illumination is performed. Also, the mounting and demounting of the light source can be conducted with ease. Accordingly, the number of processes in the installation operation is curtailed and at the same time, the replacement of the light sources alone becomes possible when it approaches its life. Moreover, there is no need for soldering the light source directly to the lamp leads to make it possible to prevent the cut off and/or deterioration of the lamp leads. Hence, the reliability of the product will be improved. Further, no metal bases are needed for power supply at both ends of the light source. This enables the total length of the light source to be shortened for the effective emission portion. Thus, the apparatus can be made more compact by that much at a lower cost because the metal base installation is no longer required.

Hereinafter, the description will be made with reference to the accompanying drawings.

Figure 21:
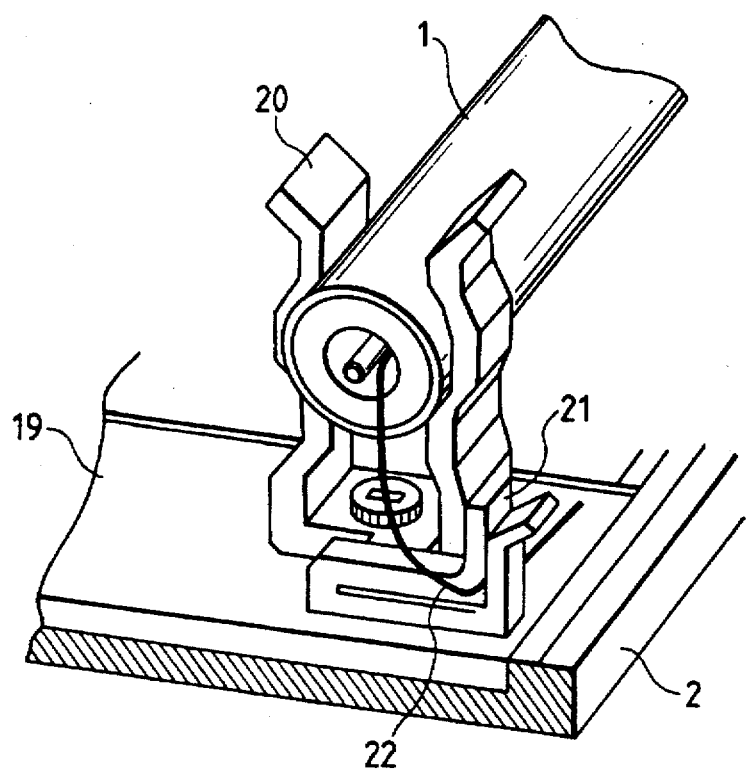

FIG. 20 is a cross-sectional view schematically showing a surface lighting device when it is applied as a backlight device. FIG. 21 is a perspective view schematically showing the principal part thereof. This device comprises a light source 1 having lamp leads 22; a reflection board 2 to reflect the light from the light source 1; a lighting curtain 14 to orientate the rays of light from the light source 1 and the reflection board 2 substantially even; a diffusion board 3 to illuminate a liquid crystal display 5 by diffusing the evenly orientated rays of light; and two clips 20 to fix the light source 1 by both sides to the reflection board 2.

One side or both sides of the clips 20 are detachable. It is arranged to fix the light source 1 by pressing the end portions into the clips 20 directly or sliding them to be inserted thereinto. The material of the clips 20 is a metal or other conductor, such as a phosphor bronze plate C5191-R½H, yet having a spring capability. This spring capability should be arranged to provide an insertion pressure of approximately 650 g on one side of the lamp when tube lamp of φ8 as a light source 1, for example. Thus, the mounting and demounting of the lamp in the clips 20 become easy, and also stabilized. There are also provided for the clips 20, lamp lead fixing portions 21 constituting the clips made of a metal or other conductive material for fixing the lamp leads whereby the lamp leads 12 are fixed and connected. The lamp lead fixing portions 21 are connected to the leads 15 for power supply through the conductive electrodes 19. In this respect, it may be possible to connect them to the leads 15 directly without any intervention of the conductive electrodes 19.

Figure 22:
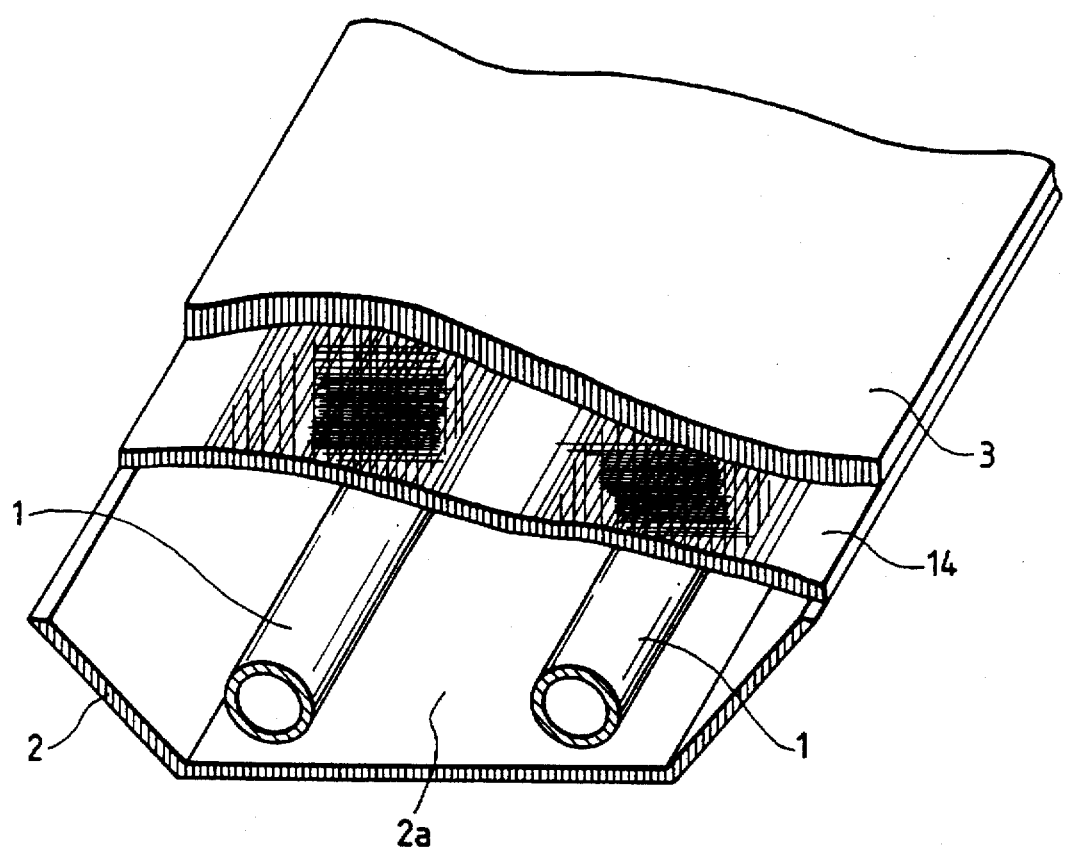
FIG. 22 is a perspective view schematically illustrating another positional relationship between the light emission surface and light sources.
Figure 23:
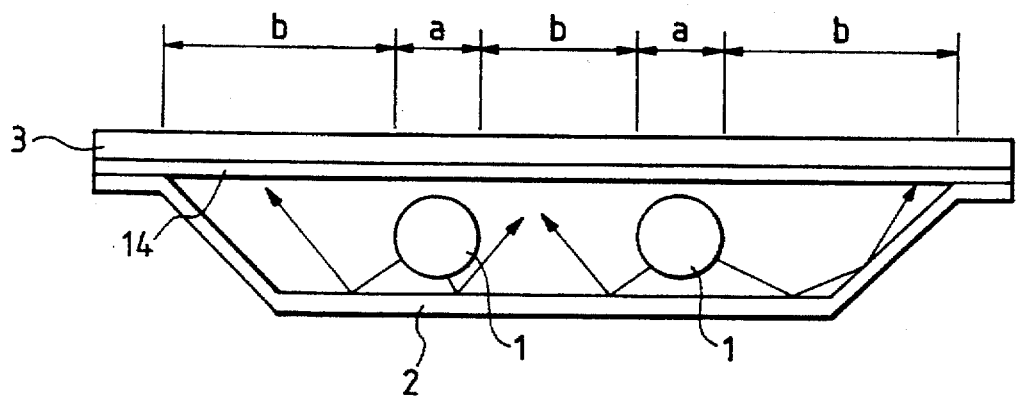
FIG. 23 is a cross-sectional view schematically illustrating the surface lighting device shown in FIG. 22.

Furthermore, as shown in FIG. 22, while the reflection board 2 is being used including the backlight device, there is encountered a problem that it becomes yellowish due to the irradiation of ultraviolet rays of light from the light source 1. Consequently, when the display is observed from its front, the color on the light source is close to the standard one, but the color on the other surfaces than this becomes yellowish, making the color unevenness conspicuous. This is not desirable from the viewpoint of maintaining image quality. To describe this event in conjunction with FIG. 23 which is a cross-sectional view of the device shown in FIG. 22, the color chromaticity of the reflection board 2 is set to match the color of the light source 1 at the initialization and thus the display can be performed highly even without any color unevenness in illumination at the initial stage of use. However, the light emitted from the portion a on the light sources 1 has almost no variation in color while in use even when time elapses because the direct rays of light from the light sources 1 are dominant and the standard color can be maintained from the beginning to the end. However, in the portion b where the reflection rays of light from the reflection board 2 are dominant, the reflection board 2 becomes yellowish due to ultraviolet rays emitted from the light sources 1. Thus, the color varies as time elapses, and towards the end of usable light, the reflection board appears to be yellowish. Consequently, the color of the portion corresponding to the portion b of the display becomes extremely yellow when observed from its front. The outer appearance of the display is spoiled.

A problem of the kind is often encountered not only when no light guide such as shown in FIG. 22 is used, but also when a light guide is used.

Particularly, the color tone variations due to the elapsed time are quite conspicuous when color images are displayed or a display has a large-area emission surface. Therefore, it is desirable to prevent this kind of problem because it may lead to lowering the quality of the finished product.

In order to solve the problem, the color of the reflection board should be set against the standard color within a range of −2.0 to 0 at the value $\Delta b^*$ in CIE1976L*a*b*. Thus, the color should preferably be slightly more bluish than the standard color. In this way, even when the yellowish color becomes more conspicuous due to the ultraviolet rays from the light sources, the adverse effect of the yellowish appearance is reduced because it takes a longer time for eye-sight before such an appearance is recognized.

Hereinafter, using FIG. 22, the description will be made. This device is different from the prior art in the way the reflection board 2 is structured. In other words, the color of the reflecting surface 2a of the reflection board 2 is arranged to be slightly bluish more than the standard color which is observable initially on the device. Thus, when it becomes yellowish due to the ultraviolet rays, such a variation will not be too conspicuous. The degree to make it bluish is such as a range where any color unevenness is noticeable at the beginning. It is preferable to set such a degree to be smaller than the standard color at the $\Delta b^*$ value in the chromatic space of CIE1976L*a*b* and less than −2 provided that the color of the reflection board 2 is made its color of reference when the color of the reflected light is matched with the color immediately above the light sources 1.

Figure 24:
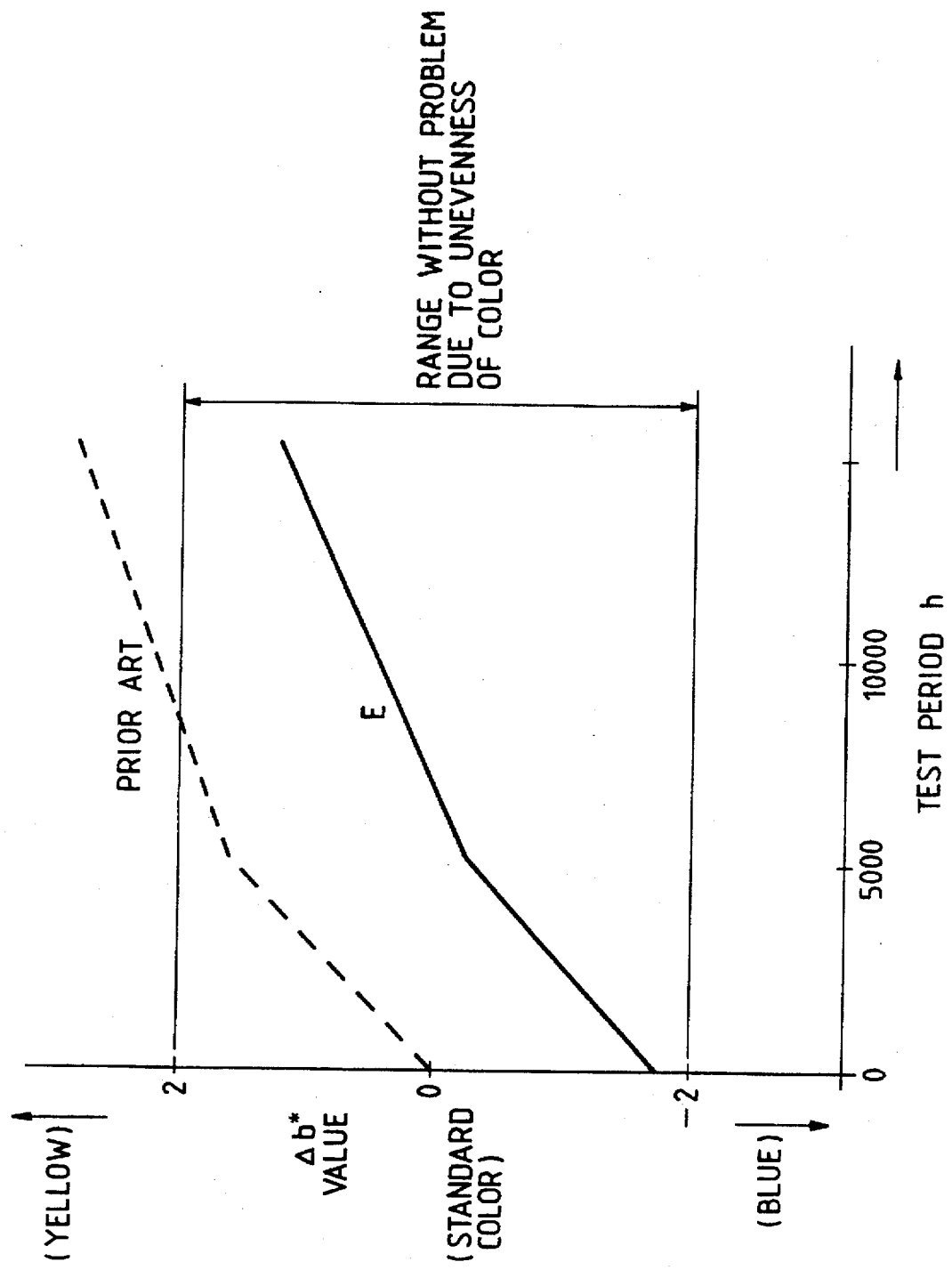
FIG. 24 is a graph illustrating an example of elapsed time variation of a reflection board.

FIG. 24 is a view showing the relationship between the illuminating time and the color chromaticity of the reflection board 2 according to the results of fading tests on the reflection board 2 in this device. In this test, the foregoing $\Delta b^*$ value of the color chromaticity is measured using a chromaticity analyzer CR-200b of Minolta Inc. and D65 light source. As a result, it is found that there is no problem of color unevenness if this $\Delta b^*$ value stays within ±2 of the standard color. In other words, within this range, as shown in FIG. 24, no conspicuous color unevenness is observed both for the initial color and the value after its variation (after 10,000 h or more for the normal use) (solid line E). On the other hand, in the prior art, since the color is adjusted to match the standard one at the beginning, the color chromaticity exceeds +2 in terms of $\Delta b^*$ value against the standard color several thousand hours and color unevenness is noticed as indicated by the broken line in FIG. 24.

Here, the standard color is determined mainly by the light source and others. While the light source color is determined by the liquid crystal and other characteristics, it is confirmed by the present inventors that color unevenness is not conspicuous if the variation of the standard color stays within the aforesaid range of Δb* even when it is varied due to the change in the light source color.

Also, in order to prevent such a variation of color tone due to the elapsed time, it is possible to anticipate an effect by coloring the diffusion board, light guide, and the like in advance.

Figure 25:
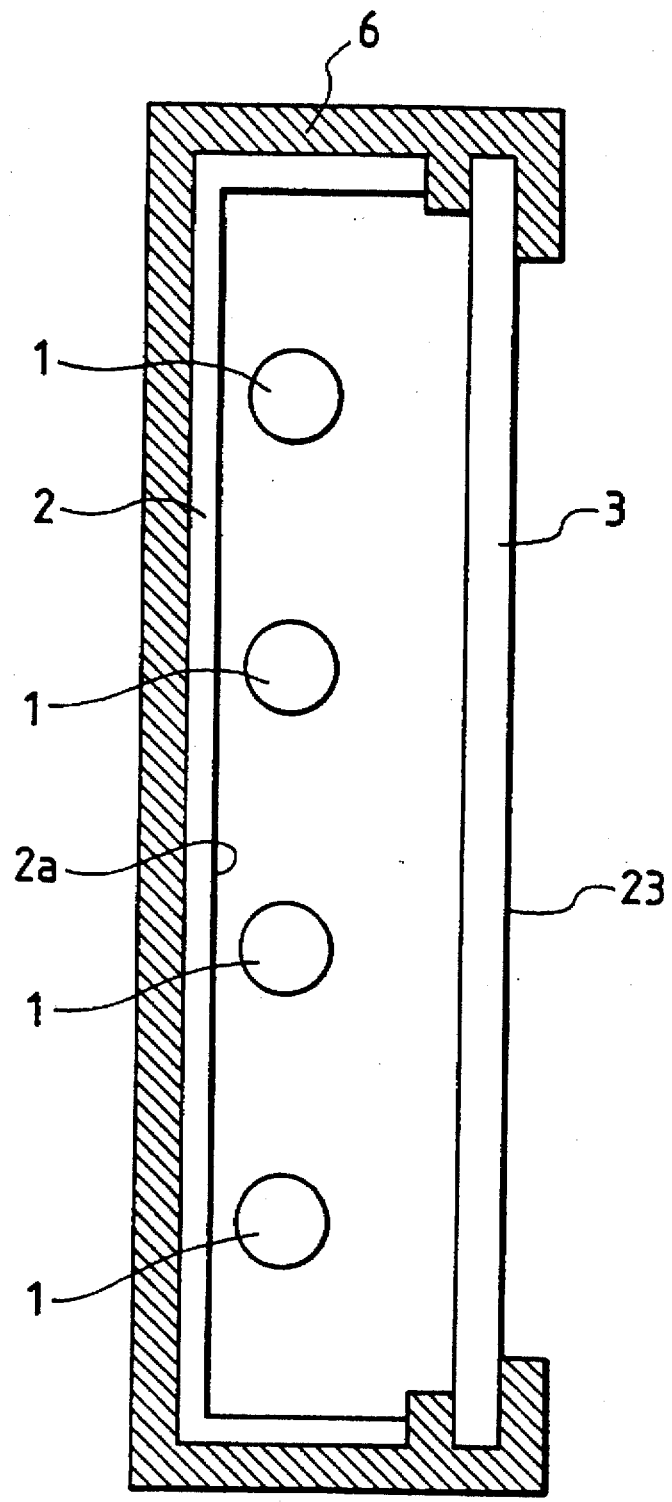
FIG. 25 is a schematically sectional view illustrating an example in which a surface light device is applied as a device for backlight source.

FIG. 25 is a cross-sectional view showing a backlight source device (display board for displaying finished products) used for the backlight source for display such as a bill board. As shown in FIG. 25, this device irradiates the surface 23 having characters, figures, pictures, and other informative contents from its rear side by a light source 1 and a reflection board 2. The surface 23 for displaying such contents is a representation displayed on a diffusion board 3. The display is protected as a whole by an outer housing 6. In this case, too, the reflecting surface 2a of the reflection board 2 becomes yellowish totally due to the ultraviolet rays from the light sources 1, and while in use, it will spoil the outer appearance. Therefore, as described earlier, the initial color of the reflection board is set on the blue side so as to improve the quality of display.

Also, when a light guide is used with light sources being arranged on the four sides of the light guide, respectively, the relationship between the length of the light source and the length of one side of the light guide is a significant element which should be considered to obtain an even illumination.

In other words, in a backlight device having a transparent light guide made of glass or plastic which is substantially quadrangular when observed from its front, which outputs the rays of light received from the side end of the aforesaid light guide after uniformalizing them through a reflection board and a diffusion board, there are provided the light sources are arranged on the four sides (side ends) of the aforesaid light guide to receive the rays of light from the four sides of the aforesaid light guide, and for the two opposing sides of the light sources, the length of the effective emission portion of the light sources is longer than the length of the effective emission surface of the surface light device while for the other two opposing sides, the length of the effective emission portion of the light sources is shorter than the length of the effective emission surface of the surface lighting device. Hence, it is made possible to improve the evenness of the illumination. Here, the length of the effective emission surface means that the maximum width of the aforesaid effective emission surface when observed from the effective emission portion sides of the respective light sources. In a preferred embodiment, the effective emission surface is a square having four sides in parallel in the longitudinal direction of the effective emission portion of the light sources. In this case, aforesaid length of the effective emission surface is equal to the length of the side near its light source.

Figure 26:
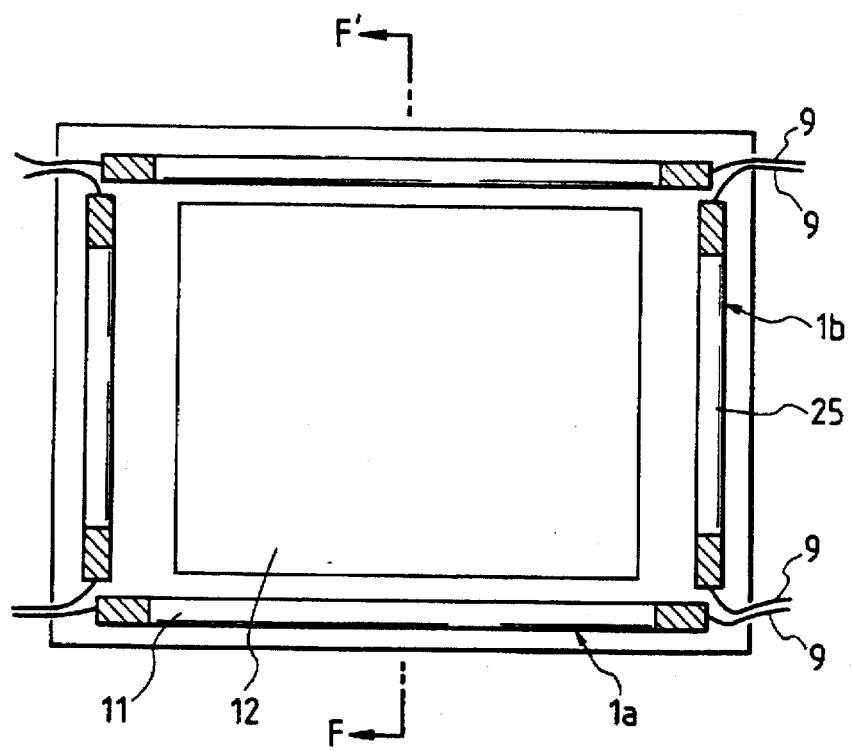
FIG. 26 and FIG. 27 are plan view schematically illustrating the arrangements of light sources for surface lighting device, respectively.

FIG. 26 is a view schematically showing the structure of a surface lighting device for the explanation of the foregoing light source arrangements. This device is provided with a light source (fluorescent lamp) 1a having a lamp emission portion 11 which is longer than the effective emission surface 12 in the direction of the longer side of the effective emission surface 12. Also, it is provided with a light source (fluorescent lamp) 1b having the lamp emission portion 11 which shorter than the effective emission surface 12 in the direction of the shorter side. Any other structures are the same as the prior art shown in FIG. 2 and FIG. 3.

Figure 2:
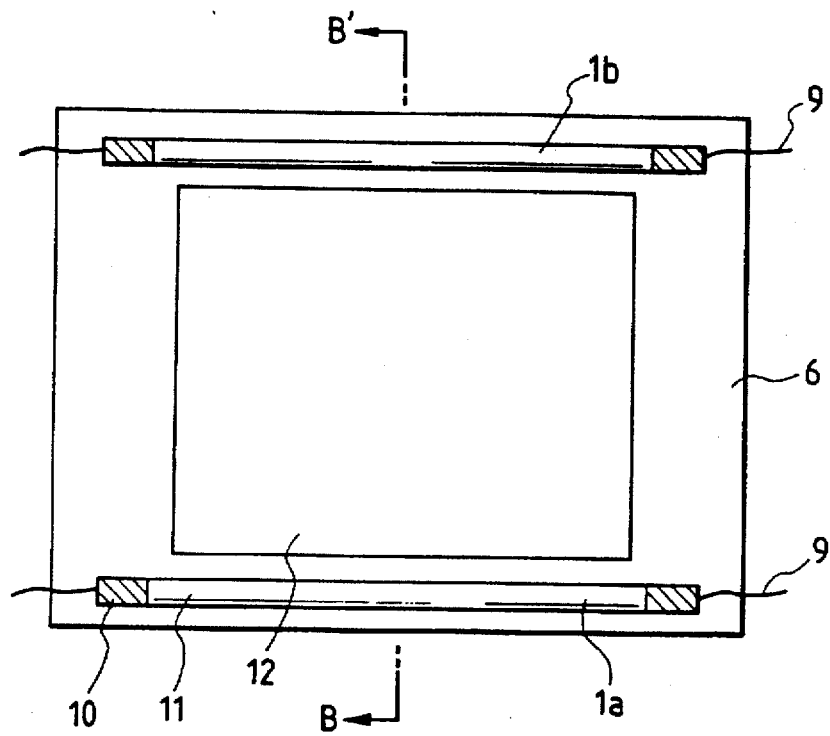
FIG. 2 is a plan view schematically showing a surface lighting device.
Figure 3:
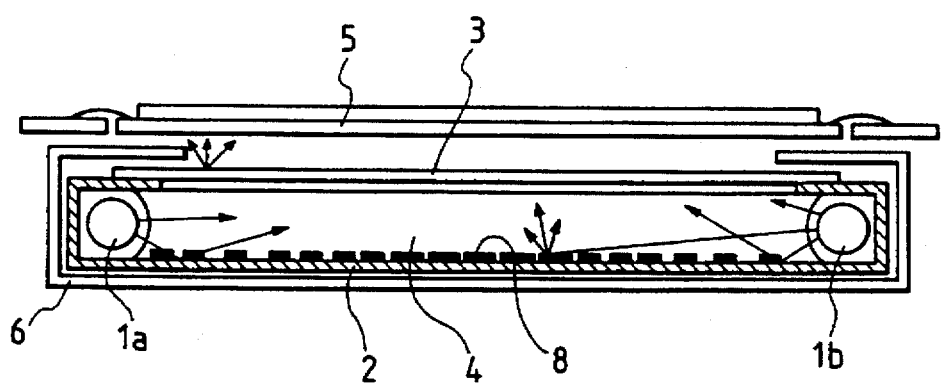
Figure 27:
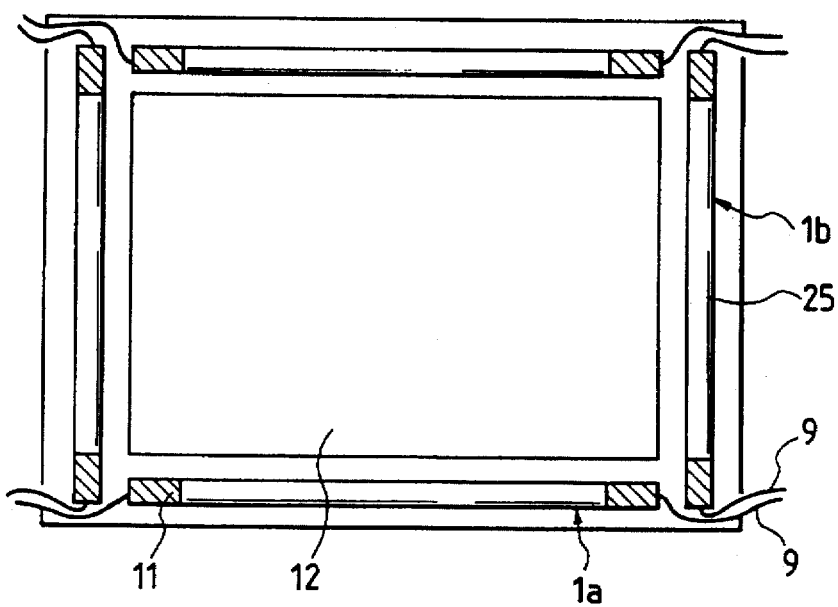

FIG. 28 is a graph showing the variations of luminance on the cross-sections taken along line F–F in FIG. 27 and line B–B' in FIG. 2. Whereas the characteristics of the luminance are such that as indicated by the broken line in FIG. 28, it is high in the vicinity of light sources while it is low in the central portion on the cross-section taken along the line B - B' in the prior art, the characteristics of the luminance obtainable on the cross-section taken along the line F–F are clearly even with a desirable efficiency as indicated by the solid line F without forcibly lowering the luminance by the light source 1b in the vicinity of the light sources.

FIG. 27 is a view showing the structure of a surface lighting device for the explanation of another example of the light source arrangement mentioned above. Contrary to the arrangement shown in FIG. 26, this device is provided with a light source 1b having the lamp emission portion 11 longer than the effective emission surface 12 in the direction of the shorter side of the effective emission surface 12, and a light source 1a having the lamp emission portion 11 shorter than the effective emission surface 12 in the direction of the shorter side. Any other structures are the same as in FIG. 26. In this case, four light sources 1a and 1b may be of an equal length, and it may be possible to couple the lamp lead portions 12 themselves on the common side. Also, using the light sources of the same length, the cost can be reduced then using light sources having two kinds of lengths.

The arrangement relationship between the length of the light sources and that of the light guide represented in FIG. 26 and FIG. 27 is also applicable to the case where the divided light guide is adopted as shown in FIG. 14 and others as a matter of course.

As described above in detail, according to the present invention, it is possible to obtain a surface lighting device having a highly efficient and even luminance at a lower cost whether it is large or thin by dividing the light guide and then bonding it to cause the incident luminous fluxes received from both ends to be diffused and emitted from the vicinity of the junctions between surfaces.

Also, according to the present invention, it is possible to enhance the precisions of the interrelated mounting positions between the light sources and the reflection board, lighting curtain, light guide, and diffusion board. As a result, the overall luminance unevenness due to the defective installation can be prevented so as to perform even illumination. Also, the breakage and deterioration of the lamp leads can be prevented for the improvement of the reliability of the finished product. Further, there is no need for the metal bases for power supply at the both ends of the light sources. Thus, the device can be made compact to fabricate the display at a low cost.

Moreover, according to the present invention, even when the yellowish appearance of the reflection board advances due to the ultraviolet rays from the light sources, the period can be prolonged before such as appearance is recognized to reduce the effect of the yellowish appearance to eye-sight.

In addition, it is possible to improve the luminance efficiency by intensifying the luminance in the central portion of the emission surface which has hitherto been low so as to equalize the luminance for the emission portion as a whole.

Also, when the light guide is divided, it becomes possible to make optical designs for the configurations thereof in accordance with the size and usage of a backlight device by varying the number of divisions, the places of junctions between surfaces or the shapes of junctions between surfaces as well as the reflection factors, refraction factors, or transmissivity of the junctions between surfaces.

Further, the present invention is capable of combining each of the above-mentioned embodiments or modifying each of them within the purport of the respective embodiments as a matter of course.

What is claimed is:

1. A surface lighting device provided with a light source and a reflection board to reflect rays of light emitted from the light source forward, wherein the color of said reflection board is set against a standard color within a range of −2.0 to 0 at Δb* value in CIE1976L*a*b*, wherein L* denotes psychometric lightness, a* denotes psychometric perceived chromaticity in the red-green region, b* denotes psychometric perceived chromaticity in the blue-yellow region of CIE1976, a uniform color space defined using a three-dimensional rectangular coordinate system adopted at the Commission Internationale de l'Eclainage, and Δb* denotes a difference between b* of a reference color and b* of a measured color of said reflection board, wherein a value of Δb* of the measured color of the reflection board is not smaller by −2 than a reference color, and smaller by 0 than the reference color at an initial state, and when the reflection board is continuously illuminated for 10,000 hours, the Δb* value of the color of the reflection board is smaller than 2, and the reference color is a color directly above the light source.

2. A surface lighting device according to claim 1, wherein said device further comprises a lighting curtain to orient the rays of light from said reflection board substantially evenly.

3. A surface lighting device according to claim 1, wherein said device further comprises a diffusion board.

4. A surface lighting device according to claim 2, wherein said device further comprises a diffusion board to diffuse the rays of light which are oriented substantially evenly by said lighting curtain.

5. A surface lighting device according to claim 1, wherein said light source is arranged between a light emitting portion of said surface lighting device and said reflection board.

6. A display having a surface lighting means provided with a light source having power supply leads, and a reflection board to which said light source is fixed, and a display panel to which rays of light from said means are irradiated, wherein the color of said reflection board is set against a standard color within a range of −2.0 to 0 at Δb* value in CIE1976L*a*b*, wherein L* denotes psychometric lightness, a* denotes psychometric perceived chromaticity in the red-green region, b* denotes psychometric perceived chromaticity in the blue-yellow region of CIE1976, a uniform color space defined using a three-dimensional rectangular coordinate system adopted at the Commission Internationale de l'Eclainage, and Δb* denotes a difference between b* of a reference color and b* of a measured color of said reflection board, wherein a value of Δb* of the measured color of the reflection board is not smaller by −2 than a reference color, and smaller by 0 than the reference color at an initial state, and when the reflection board is continuously illuminated for 10,000 hours, the Δb* value of the color of the reflection board is smaller than 2, and the reference color is a color directly above the light source.

7. A display according to claim 6, wherein said display panel is selected either from a liquid crystal display panel or a surface where contents are displayed.

8. A display according to claim 6, wherein said surface lighting means further comprises a lighting curtain to orient the rays of light from said reflection board substantially evenly.

9. A display according to claim 6, wherein said surface lighting means further has a diffusion board.

10. A display according to claim 8, wherein said surface lighting means further comprises a diffusion board to diffuse the rays of light which are oriented substantially evenly by said lighting curtain.

11. A display according to claim 6, wherein said light source is arranged between a light emitting portion of said surface lighting means and said reflection board.

12. A device according to claim 1 or 6, wherein said light source is a tube lamp arranged to penetrate through a lamp chamber provided with the reflection board, a clip connected electrically to a lamp lead of the lamp and fixing the lamp is arranged so that an opening in which the lamp lead is inserted is arranged in an orientation against the reflection board.

* * * * *

UNITED STATES PATENT AND TRADEMARK OFFICE
CERTIFICATE OF CORRECTION

PATENT NO. : 5,664,873

DATED : September 9, 1997

INVENTOR(S) : Kanda et al.

Page 1 of 4

It is certified that error appears in the above-identified patent and that said Letters Patent is hereby corrected as shown below:

Title page, item
[56] REFERENCES CITED:

"Simpson, L.A., "Yellowing of alkyd paints films," *J. Oil*" should read --Simpson, L.A., "Yellowing of alkyd paint films," *J. Oil Col.*--.

COLUMN 1:

Line 27, "and" should read --that--.

COLUMN 2:

Line 57, "the" should read --this--.

COLUMN 3:

Line 7, "an" should be deleted;
Line 16, "visivility" should read --visibility--;
Line 17, "sides" should read --side--; and
Line 18, "sides" should read --side--.

COLUMN 4:

Line 25, "increase" should read --increased--; and (sec. occur)
Line 29, "the" (second occurrence) should read --with the--.

UNITED STATES PATENT AND TRADEMARK OFFICE
CERTIFICATE OF CORRECTION

PATENT NO. : 5,664,873
DATED : September 9, 1997
INVENTOR(S) : Kanda et al.

It is certified that error appears in the above-identified patent and that said Letters Patent is hereby corrected as shown below:

COLUMN 5:

Line 3,  "a" (second occurence) should be deleted;
Line 4,  "foregoing" should read --the foregoing--; and
Line 22, "of" should read --that is--.

COLUMN 6:

Line 14, "view" should read --views--; and
Line 51, "Fig. 9," should read --Fig. 9.--.

COLUMN 7:

Line 4,  "intensity" should read --intensify--; and
Line 10, "brighter;" should read --brighter,--.

COLUMN 8:

Line 37, "it is" should read --is it--.

COLUMN 9:

Line 46, "be-configured" should read --be configured--.

UNITED STATES PATENT AND TRADEMARK OFFICE
CERTIFICATE OF CORRECTION

PATENT NO. : 5,664,873                    Page 3 of 4
DATED      : September 9, 1997
INVENTOR(S) : Kanda et al.

It is certified that error appears in the above-identified patent and that said Letters Patent is hereby corrected as shown below:

COLUMN 10:

Line 6,  "a" should be deleted; and
  Line 44, "its life." should read --the end of its useful life.--

COLUMN 11:

Line 6,  "inaccuracy, Thus, as" should read --inaccuracy. Thus,--;
  Line 10, "its life." should read --the end of its useful life.--; and
  Line 41, "when" should read --when using--.

COLUMN 12:

Line 57, "(after." should read --(after--; and
  Line 61, "several" should read --after several--.

COLUMN 13:

Line 34, "are" should be deleted; and
  Line 63, "which" should read --which is--.

COLUMN 14:

Line 51, "as" should be deleted.

UNITED STATES PATENT AND TRADEMARK OFFICE
CERTIFICATE OF CORRECTION

PATENT NO. : 5,664,873
DATED : September 9, 1997
INVENTOR(S) : Kanda et al.

It is certified that error appears in the above-identified patent and that said Letters Patent is hereby corrected as shown below:

COLUMN 15:

Line 17, "l'Eclainage," should read --l'Eclairage,--.

COLUMN 16:

Line 10, "l'Eclainage," should read --l'Eclairage,--;
Line 30, "has" should read --comprises--; and
Line 42, "board," should read --board, and--.

Signed and Sealed this

Second Day of June, 1998

Attest:

BRUCE LEHMAN

Attesting Officer

Commissioner of Patents and Trademarks